(12) United States Patent
Huang

(10) Patent No.: US 9,857,562 B2
(45) Date of Patent: Jan. 2, 2018

(54) PHOTOGRAPHING OPTICAL LENS ASSEMBLY, IMAGE CAPTURING DEVICE AND MOBILE TERMINAL

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 0 days.

(21) Appl. No.: 15/224,672

(22) Filed: Aug. 1, 2016

(65) Prior Publication Data
US 2016/0341936 A1 Nov. 24, 2016

Related U.S. Application Data

(63) Continuation of application No. 14/173,824, filed on Feb. 6, 2014, now Pat. No. 9,442,274.

(30) Foreign Application Priority Data

Jan. 8, 2014 (TW) .............................. 103100689 A

(51) Int. Cl.
*G02B 13/00* (2006.01)
*G02B 13/18* (2006.01)
(Continued)

(52) U.S. Cl.
CPC ........... *G02B 13/0045* (2013.01); *G02B 9/62* (2013.01); *G02B 27/0025* (2013.01)

(58) Field of Classification Search
CPC .. G02B 13/00; G02B 13/0015; G02B 13/002; G02B 13/0045; G02B 13/04;
(Continued)

(56) References Cited

U.S. PATENT DOCUMENTS

2003/0210475 A1 11/2003 Shinohara
2012/0229917 A1 9/2012 Huang
(Continued)

FOREIGN PATENT DOCUMENTS

CN 101365975 A 2/2009
CN 101553748 A 10/2009
(Continued)

*Primary Examiner* — Thomas K Pham
*Assistant Examiner* — Ibrahima Diedhiou
(74) *Attorney, Agent, or Firm* — CKC & Partners Co., Ltd.

(57) ABSTRACT

A photographing optical lens assembly includes, in order from an object side to an image side, a first lens element, a second lens element, a third lens element, a fourth lens element, a fifth lens element, and a sixth lens element. The first lens element with positive refractive power has an object-side surface being convex in a paraxial region thereof. The second lens element has negative refractive power. The third lens element has refractive power. The fourth lens element has refractive power. The fifth lens element with refractive power has an object-side surface being concave in a paraxial region thereof. The sixth lens element with positive refractive power has an object-side surface being convex in a paraxial region thereof, and an image-side surface being concave in a paraxial region thereof. The photographing optical lens assembly has a total of six lens elements with refractive power.

30 Claims, 16 Drawing Sheets

(51) Int. Cl.
*G02B 27/00* (2006.01)
*G02B 9/62* (2006.01)

(58) Field of Classification Search
CPC .......... G02B 13/18; G02B 3/04; G02B 5/005;
G02B 9/62; G02B 1/04; G02B 27/0025;
H04N 5/2254; H04N 5/335
USPC ....... 359/642, 708, 713, 738, 739, 752, 754,
359/756, 757, 758, 773; 348/294
See application file for complete search history.

(56) References Cited

U.S. PATENT DOCUMENTS

| | | |
|---|---|---|
| 2012/0243108 A1 | 9/2012 | Tsai et al. |
| 2013/0215520 A1 | 8/2013 | Lai et al. |
| 2014/0153117 A1* | 6/2014 | Hagiwara .......... G02B 13/0045 359/757 |
| 2015/0168677 A1 | 6/2015 | Lee et al. |
| 2015/0168686 A1 | 6/2015 | Nishihata et al. |

FOREIGN PATENT DOCUMENTS

| | | |
|---|---|---|
| CN | 101606095 A | 12/2009 |
| CN | 202404292 U | 8/2012 |
| TW | 201317620 A | 5/2013 |

\* cited by examiner

PHOTOGRAPHING OPTICAL LENS ASSEMBLY, IMAGE CAPTURING DEVICE AND MOBILE TERMINAL

RELATED APPLICATIONS

This application is a continuation of U.S. application Ser. No. 14/173,824, filed on Feb. 6, 2014, which claims priority to Taiwan Application Serial Number 103100689, filed on Jan. 8, 2014, all of which are herein incorporated by reference.

BACKGROUND

Technical Field

The present disclosure relates to a photographing optical lens assembly. More particularly, the present disclosure relates to a compact photographing optical lens assembly applicable to electronic products.

Description of Related Art

In recent years, with the popularity of mobile terminals having camera functionalities, the demand of miniaturized optical systems has been increasing.

The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure or a five-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with six-element lens structure enhance image quality and resolution. However, the surface shape and refractive power of the lens elements is not favorable for reducing the back focal length of the optical system. It is also thereby not favorable for keeping the optical system compact.

SUMMARY

According to one aspect of the present disclosure, a photographing optical lens assembly includes, in order from an object side to an image side, a first lens element, a second lens element, a third lens element, a fourth lens element, a fifth lens element, and a sixth lens element. The first lens element with positive refractive power has an object-side surface being convex in a paraxial region thereof. The second lens element has negative refractive power. The third lens element has refractive power. The fourth lens element has refractive power. The fifth lens element with refractive power has an object-side surface being concave in a paraxial region thereof, wherein both of the object-side surface and an image-side surface of the fifth lens element are aspheric. The sixth lens element with positive refractive power has an object-side surface being convex in a paraxial region thereof, and an image-side surface being concave in a paraxial region thereof, wherein the object-side surface and the image-side surface of the sixth lens element are aspheric, and at least one of the object-side surface and the image-side surface of the sixth lens element has at least one inflection point. The photographing optical lens assembly has a total of six lens elements with refractive power. When a focal length of the photographing optical lens assembly is f, a focal length of the fourth lens element is f4, a vertical distance between a non-axial critical point on the image-side surface of the sixth lens element and an optical axis is Yc62, a curvature radius of an object-side surface of the third lens element is R5, and a curvature radius of an image-side surface of the third lens element is R6, the following conditions are satisfied:

$f/f4<0.80;$ $0.1<Yc62/f<0.8;$ and $-0.5<(R5+R6)/(R5-R6)<4.0.$

According to another aspect of the present disclosure, an image capturing device includes the photographing optical lens assembly according to the aforementioned aspect and an image sensor, wherein the image sensor is located on or near an image plane of the photographing optical lens assembly.

According to still another aspect of the present disclosure, a mobile terminal includes the image capturing device according to the foregoing aspect.

According to yet another aspect of the present disclosure, a photographing optical lens assembly includes, in order from an object side to an image side, a first lens element, a second lens element, a third lens element, a fourth lens element, a fifth lens element, and a sixth lens element. The first lens element with positive refractive power has an object-side surface being convex in a paraxial region thereof. The second lens element has negative refractive power. The third lens element has refractive power. The fourth lens element has refractive power. The fifth lens element with refractive power has an object-side surface being concave in a paraxial region thereof, wherein both of the object-side surface and an image-side surface of the fifth lens element are aspheric. The sixth lens element with positive refractive power has an object-side surface being convex in a paraxial region thereof, and an image-side surface being concave in a paraxial region thereof, wherein the object-side surface and the image-side surface of the sixth lens element are aspheric, and at least one of the object-side surface and the image-side surface of the sixth lens element has at least one inflection point. The photographing optical lens assembly has a total of six lens elements with refractive power. When a focal length of the photographing optical lens assembly is f, a focal length of the fourth lens element is f4, a vertical distance between a non-axial critical point on the image-side surface of the sixth lens element and an optical axis is Yc62, a focal length of the third lens element is f3, a focal length of the fifth lens element is f5, and a focal length of the sixth lens element is f6, the following conditions are satisfied:

$f/f4<0.20;$ $0.1<Yc62/f<0.8;$ and $0.60<|f/f3|+|f/f4|+|f/f5|+|f/f6|.$

According to still yet another aspect of the present disclosure, a photographing optical lens assembly includes, in order from an object side to an image side, a first lens element, a second lens element, a third lens element, a fourth lens element, a fifth lens element, and a sixth lens element.

The first lens element with positive refractive power has an object-side surface being convex in a paraxial region thereof. The second lens element has negative refractive power. The third lens element has refractive power. The fourth lens element has refractive power. The fifth lens element with refractive power has an object-side surface being concave in a paraxial region thereof, wherein both of the object-side surface and an image-side surface of the fifth lens element are aspheric. The sixth lens element with positive refractive power has an object-side surface being convex in a paraxial region thereof, and an image-side surface being concave in a paraxial region thereof, wherein the object-side surface and the image-side surface of the sixth lens element are aspheric, and at least one of the object-side surface and the image-side surface of the sixth lens element has at least one inflection point. The photographing optical lens assembly has a total of six lens elements with refractive power. When a focal length of the photographing optical lens assembly is f, a focal length of the fourth lens element is f4, a vertical distance between a non-axial critical point on the image-side surface of the sixth lens element and an optical axis is Yc62, and a focal length of the third lens element is f3, the following conditions are satisfied:

$f/f4<0.20;$ $0.1<Yc62/f<0.8;$ and $0.20<|f/f3|.$

BRIEF DESCRIPTION OF THE DRAWINGS

The present disclosure can be more fully understood by reading the following detailed description of the embodiments, with reference made to the accompanying drawings as follows.

DETAILED DESCRIPTION

Figure 1:
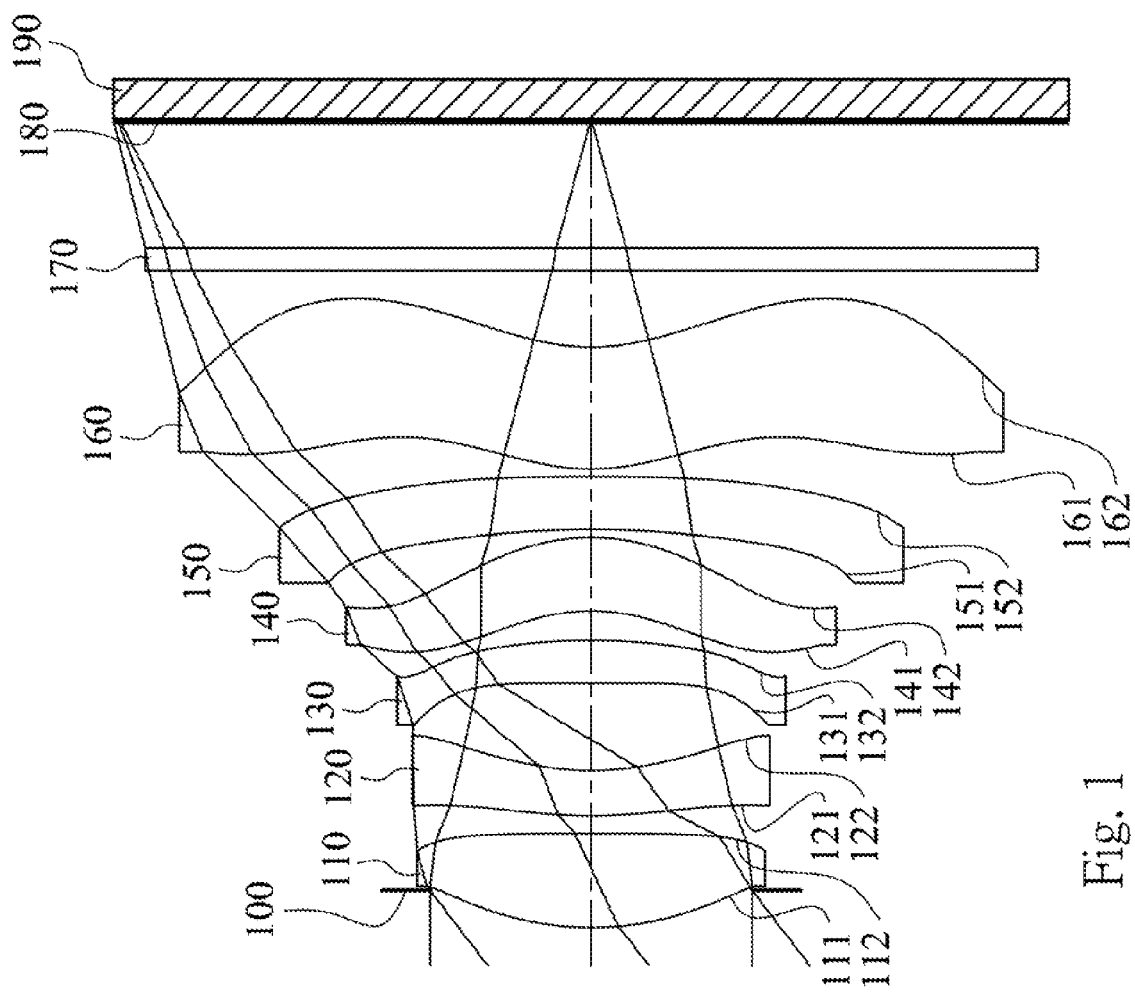
FIG. 1 is a schematic view of an image capturing device according to the 1st embodiment of the present disclosure.

A photographing optical lens assembly includes, in order from an object side to an image side, a first lens element, a second lens element, a third lens element, a fourth lens element, a fifth lens element, and a sixth lens element. The photographing optical lens assembly has a total of six lens elements with refractive power.

The first lens element with positive refractive power has an object-side surface being convex in a paraxial region thereof, so that it is favorable for reducing the total track length of the photographing optical lens assembly by properly adjusting the positive refractive power of the first lens element.

The second lens element with negative refractive power can have an image-side surface being concave in a paraxial region thereof. Therefore, it is favorable for effectively correcting the aberration of the photographing optical lens assembly.

The third lens element can have positive refractive power. Therefore, it is favorable for effectively reducing the photosensitivity of the photographing optical lens assembly.

The fourth lens element can have negative refractive power, an object-side surface being concave in a paraxial region thereof and an image-side surface being convex in a paraxial region thereof. Therefore, it is favorable for effectively correcting the astigmatism of the photographing optical lens assembly.

The fifth lens element can have negative refractive power and has an object-side surface being concave in a paraxial region thereof and an image-side surface being convex in a paraxial region thereof. Therefore, it is favorable for reducing the incident angle of the off-axis on an image plane so as to improve the photosensitivity of the photographing optical lens assembly.

The sixth lens element with positive refractive power has an object-side surface being convex in a paraxial region thereof and an image-side surface being concave in a paraxial region thereof, wherein at least one of the object-side surface and the image-side surface of the sixth lens element has at least one inflection point. Therefore, it is favorable for reducing the total track length of the photographing optical lens assembly and adjusting the back focal length of the photographing optical lens assembly. It is thereby favorable for maintaining a sufficient back focal length under limited total track length and further correcting the aberration of the off-axis.

When a focal length of the photographing optical lens assembly is f, and a focal length of the fourth lens element is f4, the following condition is satisfied: f/f4<0.80. Therefore, it is favorable for effectively reducing the aberration of the photographing optical lens assembly. Preferably, the following condition is satisfied: f/f4<0.20.

When a vertical distance between a non-axial critical point on the image-side surface of the sixth lens element and an optical axis is Yc62, and the focal length of the photographing optical lens assembly is f, the following condition is satisfied: 0.1<Yc62/f<0.8. Therefore, it is favorable for effectively reducing the incident angle of the off-axis on the image plane so as to improve the photosensitivity of the photographing optical lens assembly.

When a curvature radius of an object-side surface of the third lens element is R5, and a curvature radius of an image-side surface of the third lens element is R6, the following condition is satisfied: $-0.5<(R5+R6)/(R5-R6)<4.0$. Therefore, it is favorable for correcting the spherical aberration of the photographing optical lens assembly by properly adjusting the surface shape of the third lens element. Preferably, the following condition is satisfied: $-0.5<(R5+R6)(R5-R6)<2.5$.

When the focal length of the photographing optical lens assembly is f, the focal length of the fourth lens element is f4, a focal length of the third lens element is f3, a focal length of the fifth lens element is f5, and a focal length of the sixth lens element is f6, the following condition is satisfied: $0.60<|f/f3|+|f/f4|+|f/f5|+|f/f6|$. Therefore, it is favorable for balancing the refractive powers of the lens elements of the photographing optical lens assembly by adjusting the refractive powers so as to reduce its photosensitivity. Preferably, the following condition is satisfied: $0.80<|f/f3|+|f/f4|+|f/f5|+|f/f6|$.

When the focal length of the photographing optical lens assembly is f, and the focal length of the third lens element is f3, the following condition is satisfied: $0.20<|f/f3|$. Therefore, it is favorable for providing a satisfied refractive power so as to reduce the total track length of the photographing optical lens assembly. Preferably, the following condition is satisfied: $0.35<|f/f3|$.

When an axial distance between the second lens element and the third lens element is T23, an axial distance between the fourth lens element and the fifth lens element is T45, and an axial distance between the fifth lens element and the sixth lens element is T56, the following condition is satisfied: $0<(T45+T56)/T23<0.30$. Therefore, it is favorable for assembling the lens elements by property adjusting the axial distances between the lens elements.

When an axial distance between the object-side surface of the first lens element and the image plane is TL, and a maximum image height of the photographing optical lens assembly (half of a diagonal length of an effective photo-sensitive area of an image sensor) is ImgH, the following condition is satisfied: $TL/ImgH<1.9$. Therefore, it is favorable for reducing the total track length of the photographing optical lens assembly so as to maintain a compact size thereof.

When an Abbe number of the second lens element is V2, an Abbe number of the fifth lens element is V5, and an Abbe number of the first lens element is V1, the following condition is satisfied: $0.5<(V2+V5)/V1<1.0$. Therefore, it is favorable for correcting the chromatic aberration of the photographing optical lens assembly so as to improve the image quality.

When a curvature radius of the object-side surface of the fifth lens element is R9, and a curvature radius of the image-side surface of the fifth lens element is R10, the following condition is satisfied: $-0.40<R9/R10<0.40$. Therefore, it is favorable for effectively reducing the high-order aberration of the photographing optical lens assembly.

When the focal length of the photographing optical lens assembly is f, and a curvature radius of the image-side surface of the second lens element is R4, the following condition is satisfied: $0.3<f/R4<4.0$. Therefore, it is favorable for effectively correcting the astigmatism of the photographing optical lens assembly.

When the focal length of the photographing optical lens assembly is f, the curvature radius of the object-side surface of the fifth lens element is R9, and the curvature radius of the image-side surface of the fifth lens element is R10, the following condition is satisfied: $3.5<(|R9|+|R10|)/f$. Therefore, it is favorable for providing a proper back focal length of the photographing optical lens assembly and improving the image quality.

According to the photographing optical lens assembly of the present disclosure, the lens elements thereof can be made of glass or plastic material. When the lens elements are made of glass material, the distribution of the refractive power of the photographing optical lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the photographing optical lens assembly can also be reduced.

According to the photographing optical lens assembly of the present disclosure, each of an object-side surface and an image-side surface has a paraxial region and an off-axis region. The paraxial region refers to the region of the surface where light rays travel dose to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the photographing optical lens assembly of the present disclosure, a critical point is a non-axial point of the lens surface where its tangent is perpendicular to an optical axis.

According to the photographing optical lens assembly of the present disclosure, the photographing optical lens assembly can include at least one stop, such as an aperture stop, a glare stop or a field stop. Said glare stop or said field stop is for eliminating the stray light and thereby improving the image resolution thereof.

According to the photographing optical lens assembly of the present disclosure, an aperture stop can be configured as a front stop or a middle stop. A front stop disposed between an imaged object and the first lens element can provide a longer distance between an exit pupil of the photographing optical lens assembly and the image plane and thereby improves the image-sensing efficiency of an image sensor. A middle stop disposed between the first lens element and the image plane is favorable for enlarging the field of view of the photographing optical lens assembly and thereby provides a wider field of view for the same.

According to the photographing optical lens assembly of the present disclosure, the photographing optical lens assembly can be optionally applied to moving focus optical systems. Furthermore, the photographing optical lens assembly is featured with good correction ability and high image quality, and can be applied to 3D (three-dimensional) image capturing applications, in products such as digital cameras, mobile devices, digital tablets, wearable devices and other mobile terminals.

According to the present disclosure, an image capturing device is provided. The image capturing device includes the aforementioned photographing optical lens assembly according to the present disclosure and an image sensor, wherein the image sensor is disposed on or near the image plane of the photographing optical lens assembly. In the photographing optical lens assembly of the image capturing device, the first lens element and the six lens element have positive refractive power. Therefore, it is favorable for reducing the total track length of the photographing optical lens assembly and adjusting the back focal length of the photographing optical lens assembly. It is thereby favorable for maintaining a sufficient back focal length under limited total track length. Furthermore, the object-side surface of the fifth lens element is concave, which can effectively reduce the incident angle of the off-axis on the image plane so as to improve the photosensitivity of the photographing optical lens assembly. Preferably, the image capturing device can further include a barrel member, a holding member or a combination thereof.

According to the present disclosure, a mobile terminal is provided, wherein the mobile terminal includes the aforementioned image capturing device. The image capturing device includes the photographing optical lens assembly according to the present disclosure and the image sensor, wherein the image sensor is disposed on or near the image plane of the photographing optical lens assembly. Preferably, the mobile terminal can further include but not limited to a display, a control unit, a random access memory unit (RAM), a read only memory unit (ROM) or a combination thereof.

According to the above description of the present disclosure, the following 1st-9th specific embodiments are provided for further explanation.

1st Embodiment

Figure 2:
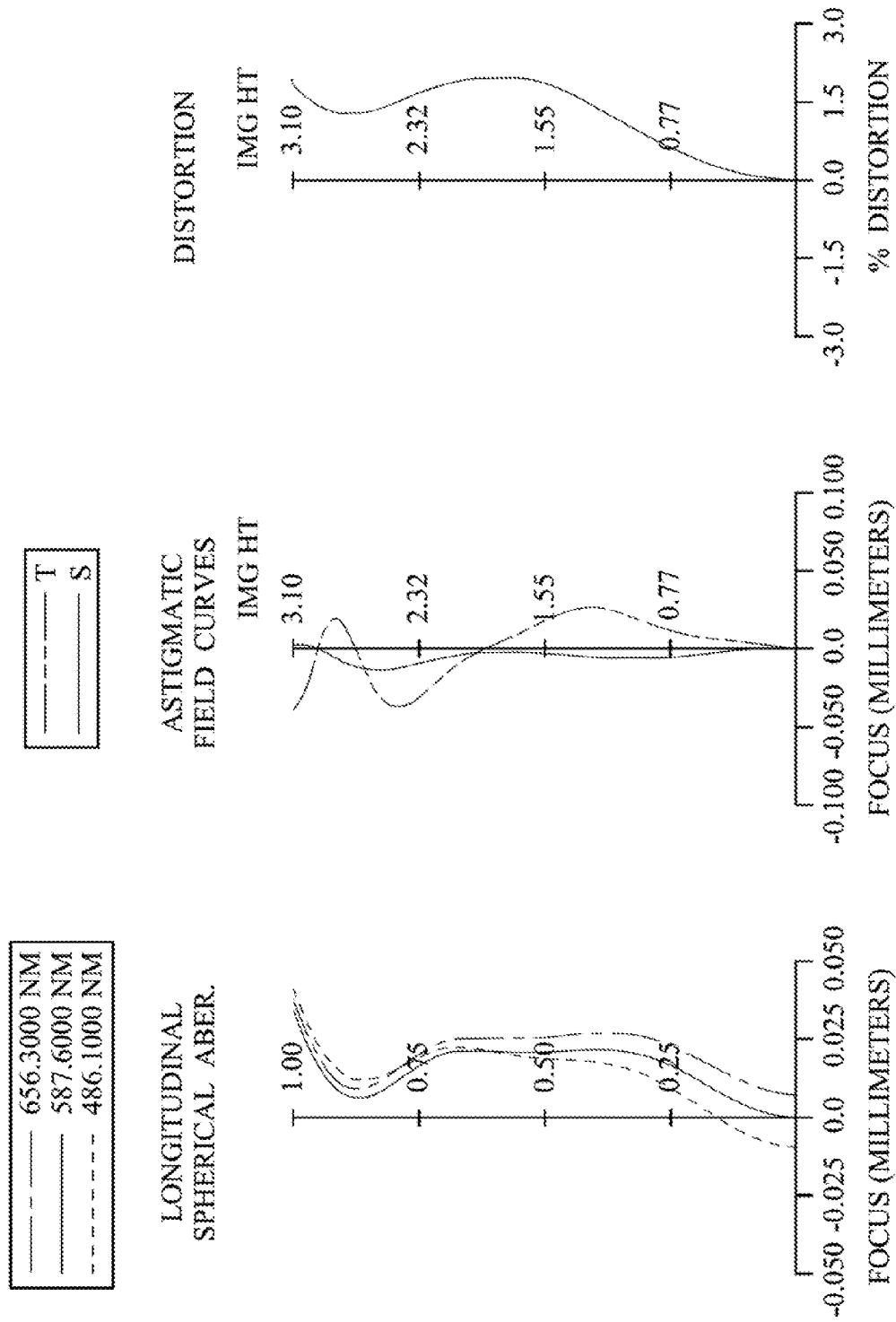
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows, in order from left to right, spherical aberration curves, astigmatic field curves and a distortion curve of the image capturing device according to the 1st embodiment.

In FIG. 1, the image capturing device includes the photographing optical lens assembly (not otherwise herein labeled) of the present disclosure and an image sensor 190. The photographing optical lens assembly includes, in order from an object side to an image side, an aperture stop 100, a first lens element 110, a second lens element 120, a third lens element 130, a fourth lens element 140, a fifth lens element 150, a sixth lens element 160, an IR-cut filter 170 and an image plane 180, wherein the photographing optical lens assembly has a total of six lens elements (110-160) with refractive power.

The first lens element 110 with positive refractive power has an object-side surface 111 being convex in a paraxial region thereof and an image-side surface 112 being concave in a paraxial region thereof, which are both aspheric, and the first lens element 110 is made of plastic material.

The second lens element 120 with negative refractive power has an object-side surface 121 being convex in a paraxial region thereof and an image-side surface 122 being concave in a paraxial region thereof, which are both aspheric, and the second lens element 120 is made of plastic material.

The third lens element 130 with positive refractive power has an object-side surface 131 being convex in a paraxial region thereof and an image-side surface 132 being convex in a paraxial region thereof, which are both aspheric, and the third lens element 130 is made of plastic material.

The fourth lens element 140 with negative refractive power has an object-side surface 141 being concave in a paraxial region thereof and an image-side surface 142 being convex in a paraxial region thereof, which are both aspheric, and the fourth lens element 140 is made of plastic material.

The fifth lens element 150 with negative refractive power has an object-side surface 151 being concave in a paraxial region thereof and an image-side surface 152 being convex in a paraxial region thereof, which are both aspheric, and the fifth lens element 150 is made of plastic material.

The sixth lens element 160 with positive refractive power has an object-side surface 161 being convex in a paraxial region thereof and an image-side surface 162 being concave in a paraxial region thereof, which are both aspheric, and the sixth lens element 160 is made of plastic material. Specifically, the image-side surface 162 of the sixth lens element 160 has at least one inflection point.

The IR-cut filter 170 is made of glass and located between the sixth lens element 160 and the image plane 180, and will not affect the focal length of the photographing optical lens assembly. The image sensor 190 is disposed on or near the image plane 180 of the photographing optical lens assembly.

The equation of the aspheric surface profiles of the aforementioned lens elements of the 1st embodiment is expressed as follows:

$$X(Y) = (Y^2/R)/(1+sqrt(1-(1+k)\times(Y/R)^2)) + \sum_i (Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing optical lens assembly of the image capturing device according to the 1st embodiment, when a focal length of the photographing optical lens assembly is f, an f-number of the photographing optical lens assembly is Fno, and half of a maximal field of view of the photographing optical lens assembly is HFOV, these parameters have the following values: f=4.01 mm; Fno=1.90; and HFOV=37.1 degrees.

In the photographing optical lens assembly of the image capturing device according to the 1st embodiment, when an Abbe number of the second lens element 120 is V2, an Abbe number of the fifth lens element 150 is V5, and an Abbe number of the first lens element 110 is V1, the following condition is satisfied: (V2+V5)/V1=0.80.

In the photographing optical lens assembly of the image capturing device according to the 1st embodiment, when an axial distance between the second lens element 120 and the third lens element 130 is T23, an axial distance between the fourth lens element 140 and the fifth lens element 150 is T45, and an axial distance between the fifth lens element 150 and the sixth lens element 160 is T56, the following condition is satisfied: (T45+T56)/T23=0.17.

In the photographing optical lens assembly of the image capturing device according to the 1st embodiment, when the focal length of the photographing optical lens assembly is f, and a curvature radius of the image-side surface 122 of the second lens element 120 is R4, the following condition is satisfied: f/R4=2.16.

In the photographing optical lens assembly of the image capturing device according to the 1st embodiment, when a curvature radius of the object-side surface 131 of the third lens element 130 is R5, and a curvature radius of the image-side surface 132 of the third lens element 130 is R6, the following condition is satisfied: (R5+R6)/(R5−R6)=0.84.

In the photographing optical lens assembly of the image capturing device according to the 1st embodiment, when a curvature radius of the object-side surface 151 of the fifth lens element 150 is R9, and a curvature radius of the image-side surface 152 of the fifth lens element 150 is R10, the following condition is satisfied: R9/R10=0.27.

In the photographing optical lens assembly of the image capturing device according to the 1st embodiment, when the focal length of the photographing optical lens assembly is f, the curvature radius of the object-side surface 151 of the fifth lens element 150 is R9, and the curvature radius of the image-side surface 152 of the fifth lens element 150 is R10, the following condition is satisfied: (|R9|+|R1|)/f=6.65.

In the photographing optical lens assembly of the image capturing device according to the 1st embodiment, when the focal length of the photographing optical lens assembly is f, and a focal length of the third lens element 130 is f3, the following condition is satisfied: |f/f3|=0.60.

In the photographing optical lens assembly of the image capturing device according to the 1st embodiment, when the focal length of the photographing optical lens assembly is f, and a focal length of the fourth lens element 140 is f4, the following condition is satisfied: f/f4=−0.07.

In the photographing optical lens assembly of the image capturing device according to the 1st embodiment, when the focal length of the photographing optical lens assembly is f, the focal length of the fourth lens element 140 is f4, the focal length of the third lens element 130 is f3, a focal length of the fifth lens element 150 is f5, and a focal length of the sixth lens element 160 is f6, the following condition is satisfied: |f/f3|+|f/f4|+|f/f5|+|f/f6|=1.29.

Figure 13:
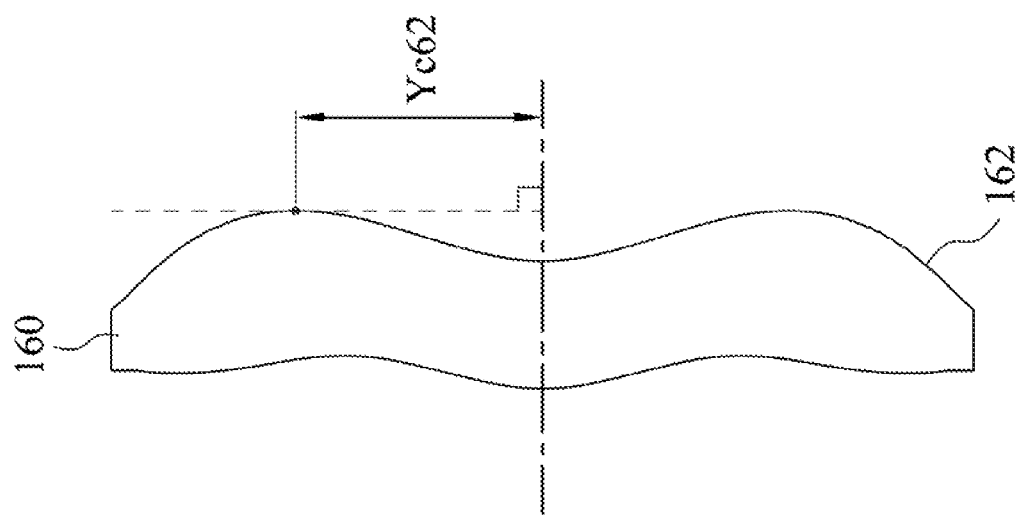
FIG. 13 shows Yc62 according to the image-side surface of the sixth lens element of the FIG. 1.

FIG. 13 shows Yc62 according to the image-side surface 162 of the sixth lens element 160 of the FIG. 1. In FIG. 13, when a vertical distance between a non-axial critical point on the image-side surface 162 of the sixth lens element 160 and an optical axis is Yc62, and the focal length of the photographing optical lens assembly is f, the following condition is satisfied: Yc62/f=0.39.

In the photographing optical lens assembly of the image capturing device according to the 1st embodiment, when an axial distance between the object-side surface 111 of the first lens element 110 and the image plane 180 is TL, and a maximum image height of the photographing optical lens assembly (half of a diagonal length of an effective photosensitive area of an image sensor 190) is ImgH, the following condition is satisfied: TL/ImgH=1.71.

The detailed optical data of the 1st embodiment are shown in Table 1 and the aspheric surface data are shown in Table 2 below.

TABLE 1

1st Embodiment
f = 4.01 mm, Fno = 1.90, HFOV = 37.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.244 | | | | |
| 2 | Lens 1 | 2.025 | ASP | 0.616 | Plastic | 1.544 | 55.9 | 3.76 |
| 3 | | 157.158 | ASP | 0.118 | | | | |
| 4 | Lens 2 | 3.176 | ASP | 0.292 | Plastic | 1.650 | 21.4 | −7.56 |
| 5 | | 1.859 | ASP | 0.576 | | | | |
| 6 | Lens 3 | 43.655 | ASP | 0.278 | Plastic | 1.535 | 55.7 | 6.66 |
| 7 | | −3.873 | ASP | 0.196 | | | | |
| 8 | Lens 4 | −1.153 | ASP | 0.482 | Plastic | 1.544 | 55.9 | −54.29 |
| 9 | | −1.377 | ASP | 0.050 | | | | |
| 10 | Lens 5 | −5.709 | ASP | 0.349 | Plastic | 1.640 | 23.3 | −12.38 |
| 11 | | −20.948 | ASP | 0.050 | | | | |
| 12 | Lens 6 | 1.401 | ASP | 0.800 | Plastic | 1.544 | 55.9 | 13.59 |
| 13 | | 1.380 | ASP | 0.500 | | | | |
| 14 | IR-cut filter | Plano | | 0.145 | Glass | 1.517 | 64.2 | — |
| 15 | | Plano | | 0.839 | | | | |
| 16 | Image | Plano | | — | | | | |

Note:
Reference wavelength is 587.6 nm (d-line).

TABLE 2

Aspheric Coefficients

| | Surface # | | | | |
|---|---|---|---|---|---|
| 2 | 3 | 4 | 5 | 6 | 7 |
| k = 9.4815E−01 | −1.0000E+00 | −1.0000E+00 | −4.1393E+00 | −1.0000E+00 | 1.0000E+00 |
| A4 = −2.2951E−02 | −6.0032E−02 | −1.5085E−01 | −4.6188E−02 | −7.0437E−02 | 3.5278E−02 |
| A6 = 2.2564E−02 | 3.2957E−02 | 1.0162E−01 | 4.4825E−02 | −1.2930E−01 | −1.1281E−01 |
| A8 = −8.0335E−02 | 4.8636E−02 | 5.1027E−02 | 6.7158E−02 | 3.3448E−01 | 2.0997E−01 |
| A10 = 7.9651E−02 | −1.5823E−01 | −2.2253E−01 | −1.9538E−01 | −6.2648E−01 | −3.1830E−01 |
| A12 = −3.8137E−02 | 1.1429E−01 | 1.6797E−01 | 1.5336E−01 | 4.7669E−01 | 2.1785E−01 |

TABLE 2-continued

Aspheric Coefficients

| A14 = | −9.5600E−04 | −3.0549E−02 | −3.7803E−02 | −4.4335E−02 | −1.2847E−01 | −5.8816E−02 |
|---|---|---|---|---|---|---|
| A16 = | | | | | 1.9329E−03 | 5.6150E−03 |

| | Surface # | | | | | |
|---|---|---|---|---|---|---|
| | 8 | 9 | 10 | 11 | 12 | 13 |
| k = | −5.1888E+00 | −1.3152E+00 | −9.7469E+00 | 1.8346E+00 | −5.6673E+00 | −3.7975E+00 |
| A4 = | −4.8174E−02 | −2.5599E−02 | 2.5593E−02 | −8.2265E−03 | −5.5558E−02 | −5.6705E−02 |
| A6 = | 1.1664E−01 | 1.1420E−01 | −2.3330E−02 | −1.3635E−02 | −1.5016E−02 | 8.2426E−03 |
| A8 = | −4.0743E−02 | −1.5067E−01 | 7.8411E−03 | 9.4654E−03 | 1.1890E−02 | −6.3618E−04 |
| A10 = | 5.4138E−03 | 1.3205E−01 | −1.3612E−03 | −2.8654E−03 | −2.5316E−03 | −9.8906E−05 |
| A12 = | −1.3382E−03 | −5.7848E−02 | 1.4495E−04 | 5.6722E−04 | 2.4060E−04 | 2.8684E−05 |
| A14 = | 3.4642E−04 | 1.1908E−02 | −6.5429E−05 | −9.0844E−05 | −9.0214E−06 | −3.0826E−06 |
| A16 = | | −9.2453E−04 | | 7.1724E−06 | 3.0208E−08 | 1.5358E−07 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
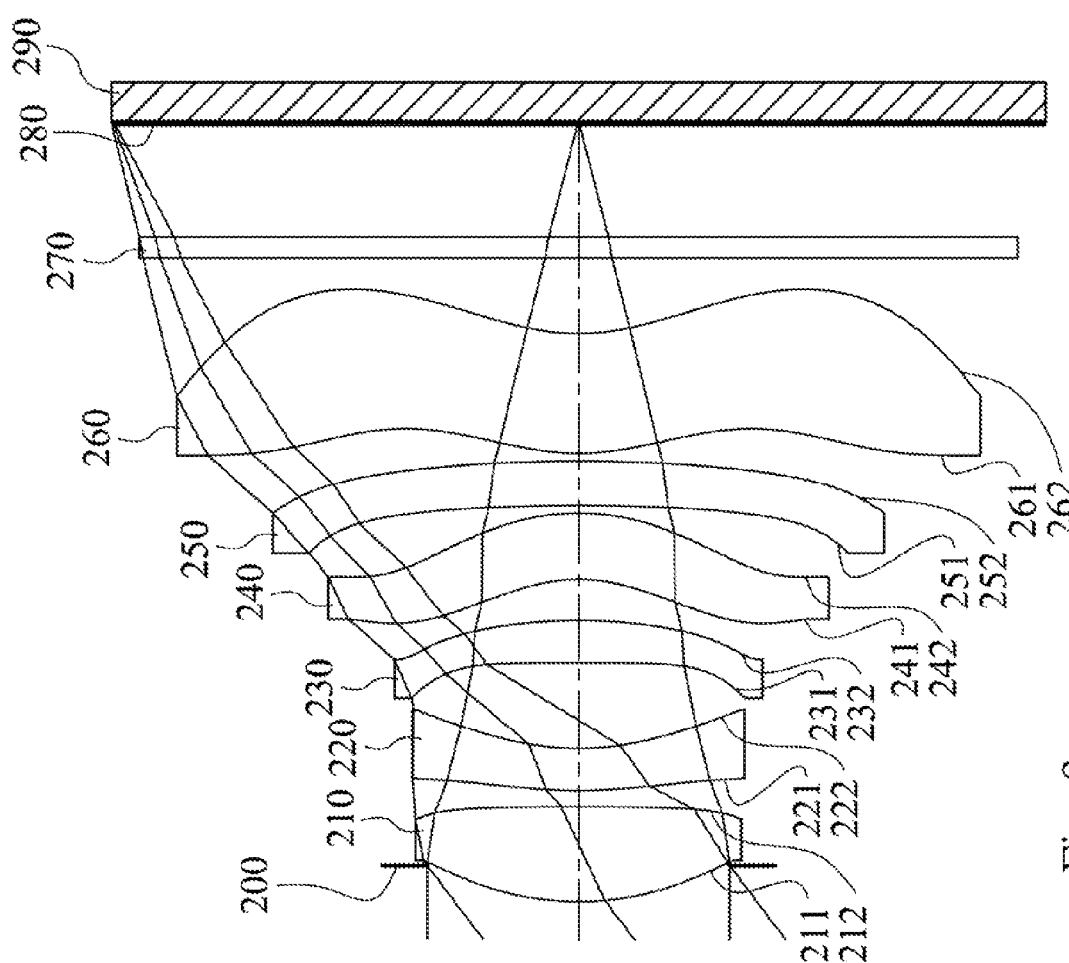
FIG. 3 is a schematic view of an image capturing device according to the 2nd embodiment of the present disclosure.
Figure 4:
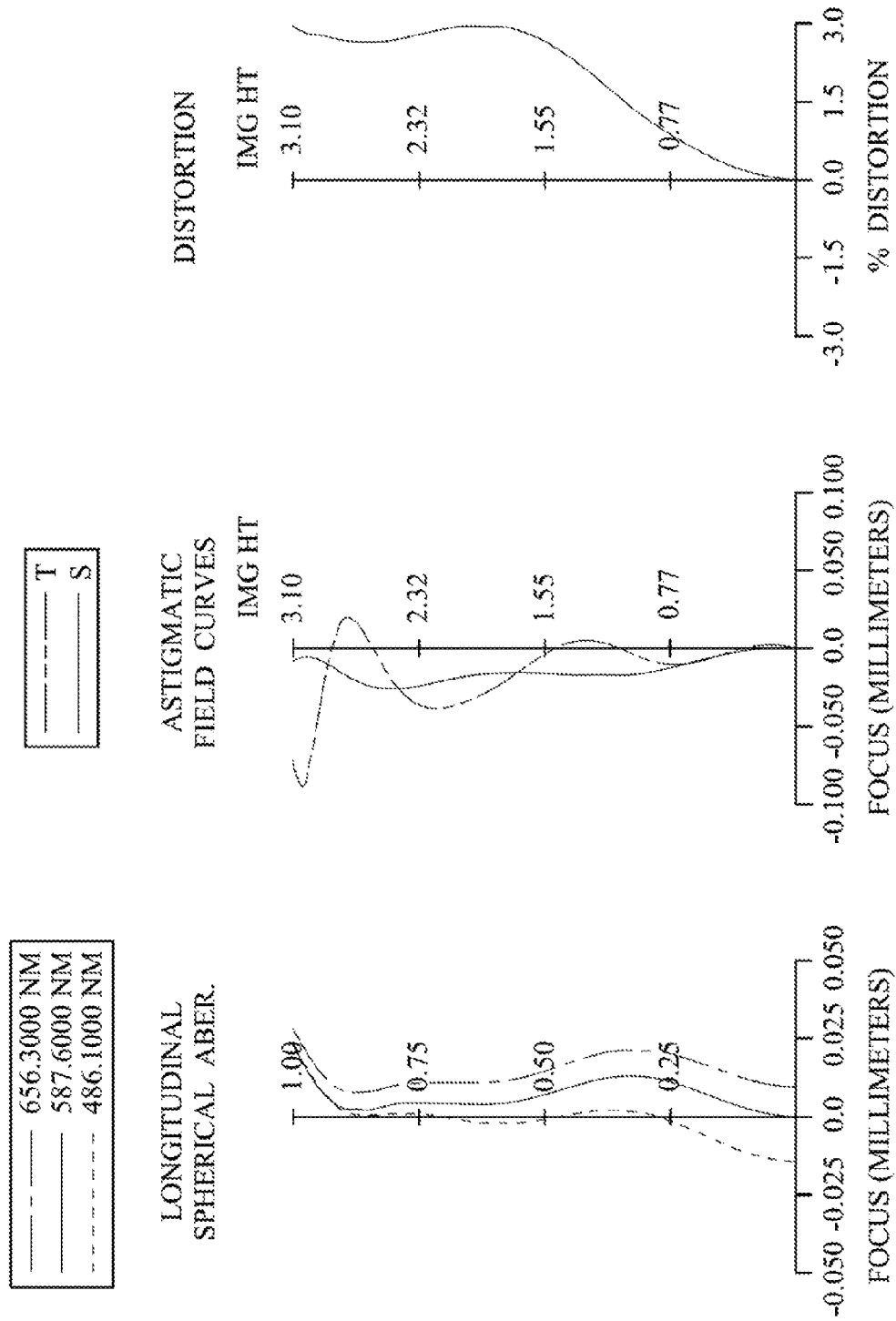
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows, in order from left to right, spherical aberration curves, astigmatic field curves and a distortion curve of the image capturing device according to the 2nd embodiment.

In FIG. 3, the image capturing device includes the photographing optical lens assembly (not otherwise herein labeled) of the present disclosure and an image sensor 290. The photographing optical lens assembly includes, in order from an object side to an image side, an aperture stop 200, a first lens element 210, a second lens element 220, a third lens element 230, a fourth lens element 240, a fifth lens element 250, a sixth lens element 260, an IR-cut filter 270 and an image plane 280, wherein the photographing optical lens assembly has a total of six lens elements (210-260) with refractive power.

The first lens element 210 with positive refractive power has an object-side surface 211 being convex in a paraxial region thereof and an image-side surface 212 being convex in a paraxial region thereof, which are both aspheric, and the first lens element 210 is made of plastic material.

The second lens element 220 with negative refractive power has an object-side surface 221 being convex in a paraxial region thereof and an image-side surface 222 being concave in a paraxial region thereof, which are both aspheric, and the second lens element 220 is made of plastic material.

The third lens element 230 with positive refractive power has an object-side surface 231 being concave in a paraxial region thereof and an image-side surface 232 being convex in a paraxial region thereof, which are both aspheric, and the third lens element 230 is made of plastic material.

The fourth lens element 240 with negative refractive power has an object-side surface 241 being concave in a paraxial region thereof and an image-side surface 242 being convex in a paraxial region thereof, which are both aspheric, and the fourth lens element 240 is made of plastic material.

The fifth lens element 250 with positive refractive power has an object-side surface 251 being concave in a paraxial region thereof and an image-side surface 252 being convex in a paraxial region thereof, which are both aspheric, and the fifth lens element 250 is made of plastic material.

The sixth lens element 260 with positive refractive power has an object-side surface 261 being convex in a paraxial region thereof and an image-side surface 262 being concave in a paraxial region thereof, which are both aspheric, and the sixth lens element 260 is made of plastic material. Specifically, the image-side surface 262 of the sixth lens element 260 has at least one inflection point.

The IR-cut filter 270 is made of glass and located between the sixth lens element 260 and the image plane 280, and will not affect the focal length of the photographing optical lens assembly. The image sensor 290 is disposed on or near the image plane 280 of the photographing optical lens assembly.

The detailed optical data of the 2nd embodiment are shown in Table 3 and the aspheric surface data are shown in Table 4 below.

TABLE 3

2nd Embodiment
f = 4.03 mm, Fno = 2.00, HFOV = 36.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.242 | | | | |
| 2 | Lens 1 | 1.933 | ASP | 0.633 | Plastic | 1.544 | 55.9 | 3.46 |
| 3 | | −60.922 | ASP | 0.107 | | | | |
| 4 | Lens 2 | 3.193 | ASP | 0.277 | Plastic | 1.650 | 21.4 | −6.22 |
| 5 | | 1.723 | ASP | 0.576 | | | | |

TABLE 3-continued

2nd Embodiment
f = 4.03 mm, Fno = 2.00, HFOV = 36.8 deg.

| Surface # | | Curvature Radius | | Thickness | Material | Index | Abbe # | Focal Length |
|---|---|---|---|---|---|---|---|---|
| 6 | Lens 3 | −227.430 | ASP | 0.278 | Plastic | 1.535 | 55.7 | 6.37 |
| 7 | | −3.358 | ASP | 0.277 | | | | |
| 8 | Lens 4 | −1.067 | ASP | 0.438 | Plastic | 1.544 | 55.9 | −9.06 |
| 9 | | −1.559 | ASP | 0.050 | | | | |
| 10 | Lens 5 | −13.472 | ASP | 0.300 | Plastic | 1.650 | 21.4 | 46.65 |
| 11 | | −9.408 | ASP | 0.052 | | | | |
| 12 | Lens 6 | 1.556 | ASP | 0.798 | Plastic | 1.544 | 55.9 | 28.83 |
| 13 | | 1.415 | ASP | 0.500 | | | | |
| 14 | IR-cut filter | Plano | | 0.145 | Glass | 1.517 | 64.2 | — |
| 15 | | Plano | | 0.760 | | | | |
| 16 | Image | Plano | | — | | | | |

Note:
Reference wavelength is 587.6 nm (d-line).

TABLE 4

Aspheric Coefficients

| Surfce # | | | | | |
|---|---|---|---|---|---|
| 2 | 3 | 4 | 5 | 6 | 7 |
| k = 9.2977E−01 | −1.0000E+00 | −1.0000E+00 | −3.9229E+00 | −1.0000E+00 | 1.0000E+00 |
| A4 = −2.4856E−02 | −4.6810E−02 | −1.5164E−01 | −4.5415E−02 | −5.0628E−02 | 3.3218E−02 |
| A6 = 2.3126E−02 | 2.9468E−02 | 1.0858E−01 | 4.8394E−02 | −1.4861E−01 | −1.1180E−01 |
| A8 = −8.1565E−02 | 4.4285E−02 | 5.0867E−02 | 7.1507E−02 | 3.3021E−01 | 2.0947E−01 |
| A10 = 7.7309E−02 | −1.5581E−01 | −2.2126E−01 | −1.9443E−01 | −6.2121E−01 | −3.1867E−01 |
| A12 = −3.8137E−02 | 1.1532E−01 | 1.6843E−01 | 1.5349E−01 | 4.8154E−01 | 2.1789E−01 |
| A14 = −5.3182E−04 | −3.1020E−02 | −3.7201E−02 | −4.4335E−02 | −1.2887E−01 | −5.8375E−02 |
| A16 = | | | | −1.2055E−03 | 6.2635E−03 |

| Surface # | | | | | |
|---|---|---|---|---|---|
| 8 | 9 | 10 | 11 | 12 | 13 |
| k = −4.8946E+00 | −1.3152E+00 | 3.0000E+00 | 1.8346E+00 | −7.7814E+00 | −4.2385E+00 |
| A4 = −4.9471E−02 | −3.2022E−02 | 8.1197E−03 | 1.8115E−02 | −5.5288E−02 | −5.4489E−02 |
| A6 = 1.1764E−01 | 1.1363E−01 | −1.6748E−02 | −1.9357E−02 | −1.4939E−02 | 7.5113E−03 |
| A8 = −4.1050E−02 | −1.5061E−01 | 7.8411E−03 | 9.2521E−03 | 1.1897E−02 | −6.1559E−04 |
| A10 = 5.4138E−03 | 1.3216E−01 | −1.8589E−03 | −2.8067E−03 | −2.5324E−03 | −9.2821E−05 |
| A12 = −1.5332E−03 | −5.7824E−02 | 1.0927E−04 | 5.7280E−04 | 2.4055E−04 | 2.8919E−05 |
| A14 = 3.8277E−04 | 1.1907E−02 | −1.1293E−05 | −9.0275E−05 | −9.0366E−06 | −3.1309E−06 |
| A16 = | −9.3346E−04 | | 7.3570E−06 | 2.8116E−08 | 1.4352E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 4.03 | R9/R10 | 1.43 |
| Fno | 2.00 | (|R9| + |R10|)/f | 5.68 |
| HFOV [deg.] | 36.8 | |f/f3| | 0.63 |
| (V2 + V5)/V1 | 0.77 | f/f4 | −0.44 |
| (T45 + T56)/T23 | 0.18 | |f/f3| + |f/f4| + |f/f5| + |f/f6| | 1.30 |
| f/R4 | 2.34 | Yc62/f | 0.37 |
| (R5 + R6)/(R5 − R6) | 1.03 | TL/ImgH | 1.67 |

3rd Embodiment

Figure 5:
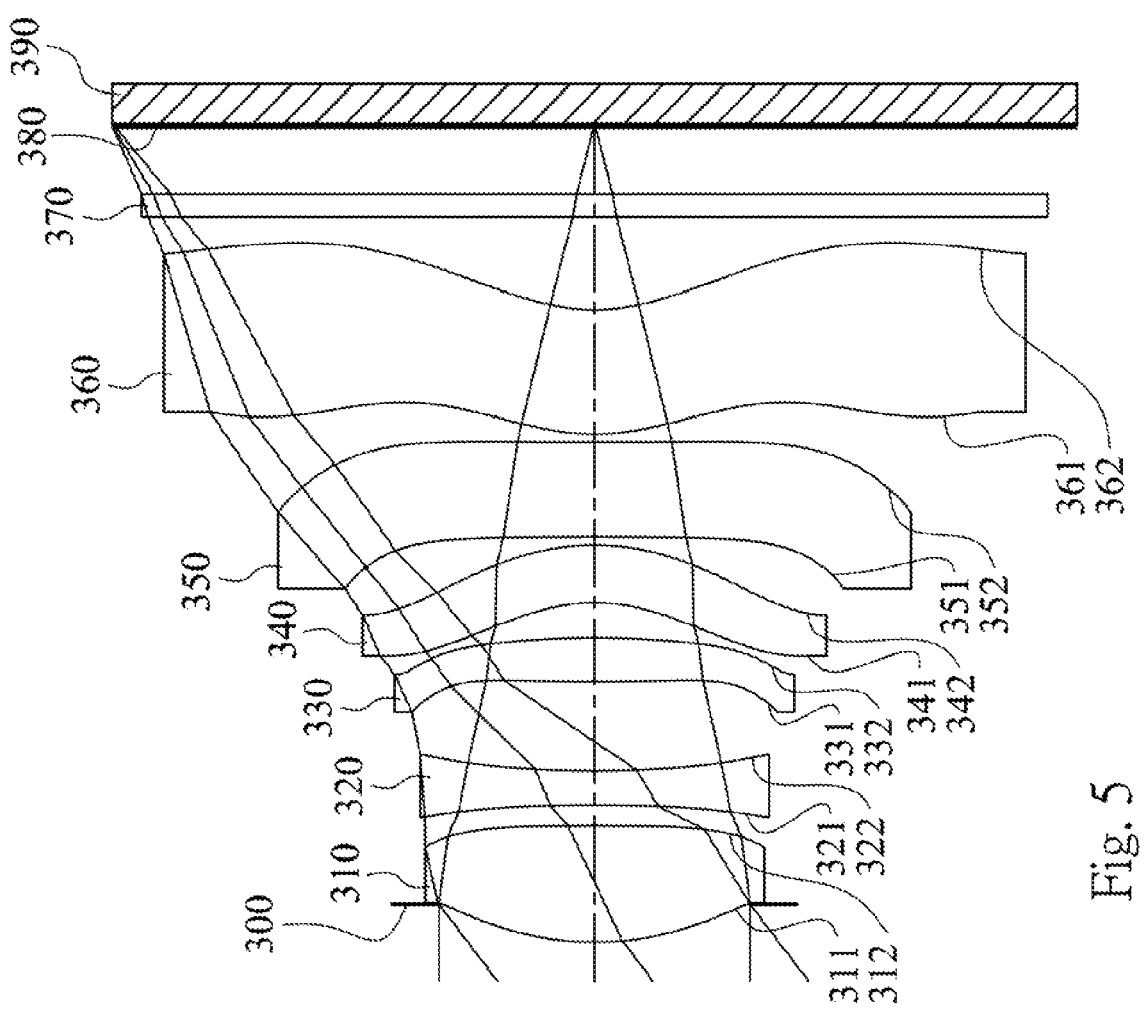
FIG. 5 is a schematic view of an image capturing device according to the 3rd embodiment of the present disclosure.
Figure 6:
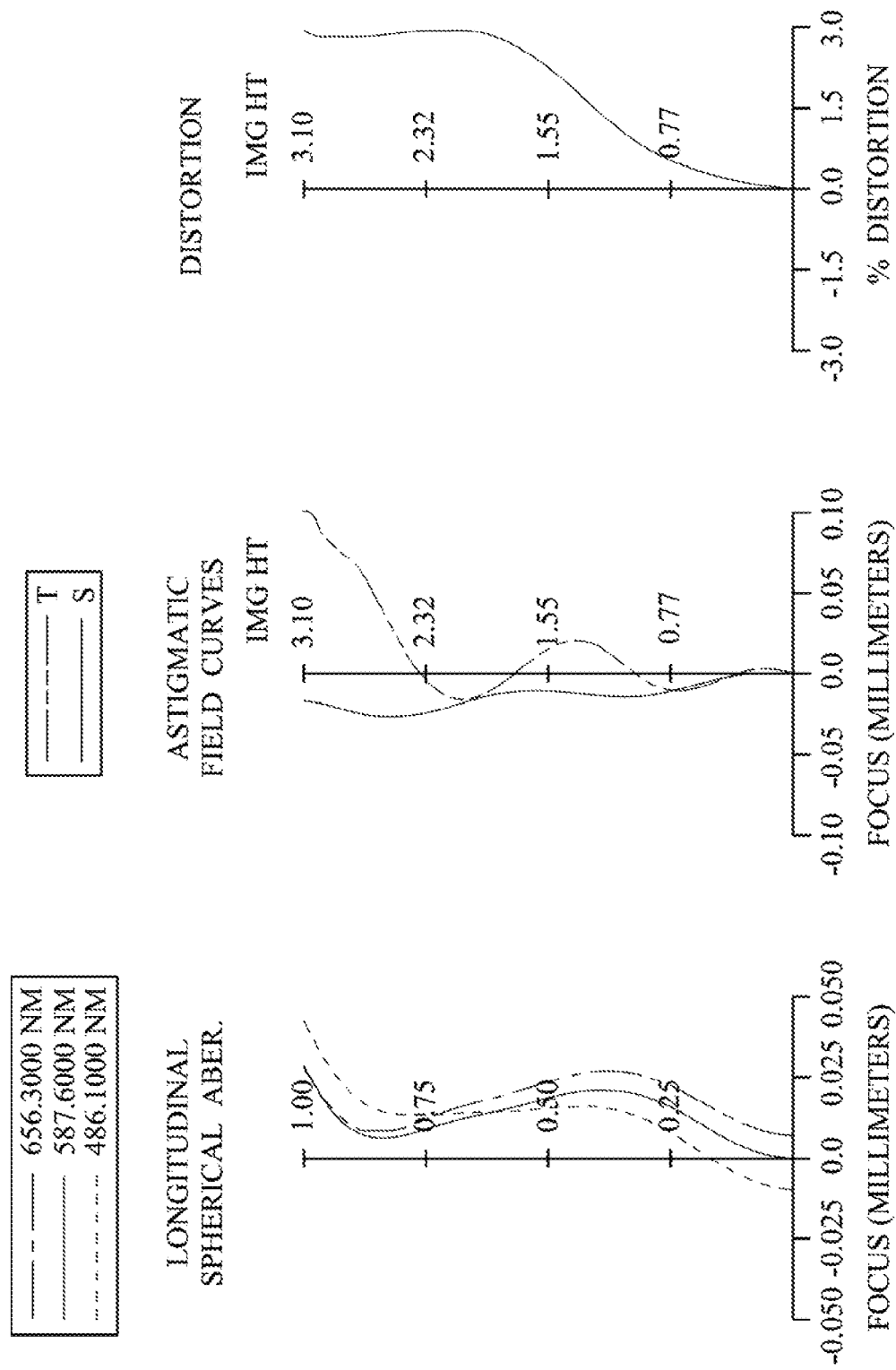
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows, in order from left to right, spherical aberration curves, astigmatic field curves and a distortion curve of the image capturing device according to the 3rd embodiment.

In FIG. 5, the image capturing device includes the photographing optical lens assembly (not otherwise herein labeled) of the present disclosure and an image sensor 390. The photographing optical lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 370 and an image plane 380, wherein the photographing optical lens assembly has a total of six lens elements (310-360) with refractive power.

The first lens element 310 with positive refractive power has an object-side surface 311 being convex in a paraxial region thereof and an image-side surface 312 being convex in a paraxial region thereof, which are both aspheric, and the first lens element 310 is made of plastic material.

The second lens element 320 with negative refractive power has an object-side surface 321 being concave in a paraxial region thereof and an image-side surface 322 being concave in a paraxial region thereof, which are both aspheric, and the second lens element 320 is made of plastic material.

The third lens element 330 with positive refractive power has an object-side surface 331 being convex in a paraxial region thereof and an image-side surface 332 being convex in a paraxial region thereof, which are both aspheric, and the third lens element 330 is made of plastic material.

The fourth lens element 340 with negative refractive power has an object-side surface 341 being concave in a paraxial region thereof and an image-side surface 342 being convex in a paraxial region thereof, which are both aspheric, and the fourth lens element 340 is made of plastic material.

The fifth lens element 350 with negative refractive power has an object-side surface 351 being concave in a paraxial region thereof and an image-side surface 352 being concave in a paraxial region thereof, which are both aspheric, and the fifth lens element 350 is made of plastic material.

The sixth lens element 360 with positive refractive power has an object-side surface 361 being convex in a paraxial region thereof and an image-side surface 362 being concave in a paraxial region thereof, which are both aspheric, and the sixth lens element 360 is made of plastic material. Specifically, the image-side surface 362 of the sixth lens element 360 has at least one inflection point.

The IR-cut filter 370 is made of glass and located between the sixth lens element 360 and the image plane 380, and will not affect the focal length of the photographing optical lens assembly. The image sensor 390 is disposed on or near the image plane 380 of the photographing optical lens assembly.

The detailed optical data of the 3rd embodiment are shown in Table 5 and the aspheric surface data are shown in Table 6 below.

TABLE 5

3rd Embodiment
f = 4.00 mm, Fno = 2.00, HFOV = 36.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.245 | | | | |
| 2 | Lens 1 | 1.914 | ASP | 0.750 | Plastic | 1.535 | 55.7 | 3.40 |
| 3 | | −31.629 | ASP | 0.131 | | | | |
| 4 | Lens 2 | −18.832 | ASP | 0.220 | Plastic | 1.650 | 21.4 | −7.76 |
| 5 | | 6.919 | ASP | 0.576 | | | | |
| 6 | Lens 3 | 10.614 | ASP | 0.278 | Plastic | 1.535 | 55.7 | 6.71 |
| 7 | | −5.371 | ASP | 0.231 | | | | |
| 8 | Lens 4 | −1.111 | ASP | 0.369 | Plastic | 1.535 | 55.7 | −9.79 |
| 9 | | −1.573 | ASP | 0.050 | | | | |
| 10 | Lens 5 | −28.670 | ASP | 0.615 | Plastic | 1.650 | 21.4 | −41.11 |
| 11 | | 394.393 | ASP | 0.050 | | | | |
| 12 | Lens 6 | 1.414 | ASP | 0.800 | Plastic | 1.535 | 55.7 | 41.19 |
| 13 | | 1.213 | ASP | 0.600 | | | | |
| 14 | IR-cut filter | Plano | | 0.145 | Glass | 1.517 | 64.2 | — |
| 15 | | Plano | | 0.441 | | | | |
| 16 | Image | Plano | | — | | | | |

Note:
Reference wavelength is 587.6 nm (d-line).

TABLE 6

Aspheric Coefficients

| | Surface # | | | | | |
|---|---|---|---|---|---|---|
| | 2 | 3 | 4 | 5 | 6 | 7 |
| k = | 8.0473E−01 | −1.0000E+00 | −1.0000E+00 | 2.9016E+00 | −1.0000E+00 | −2.3161E+00 |
| A4 = | −3.0266E−02 | −6.2744E−02 | −9.0974E−02 | −4.0344E−02 | −3.3743E−02 | 5.1562E−02 |
| A6 = | 2.6216E−02 | 8.5743E−04 | 1.0790E−02 | 6.9166E−02 | −1.2735E−01 | −1.2111E−01 |
| A8 = | −9.0351E−02 | 5.2826E−02 | 3.1441E−02 | 7.0629E−02 | 3.3319E−01 | 2.0648E−01 |
| A10 = | 8.2186E−02 | −1.4803E−01 | −2.1698E−01 | −2.0184E−01 | −6.2539E−01 | −3.2007E−01 |
| A12 = | −3.8137E−02 | 1.1135E−01 | 1.8287E−01 | 1.5531E−01 | 4.6980E−01 | 2.1531E−01 |
| A14 = | −2.3080E−03 | −3.0849E−02 | −4.7714E−02 | −4.4335E−02 | −1.3206E−01 | −5.9928E−02 |
| A16 = | | | | | 5.5536E−03 | 6.4400E−03 |

| | Surface # | | | | | |
|---|---|---|---|---|---|---|
| | 8 | 9 | 10 | 11 | 12 | 13 |
| k = | −4.7199E+00 | −1.3152E+00 | 3.0000E+00 | 3.0000E+00 | −6.1367E+00 | −3.8699E+00 |
| A4 = | −7.6226E−02 | −3.6160E−02 | 1.9005E−02 | 1.6354E−02 | −5.5053E−02 | −4.5914E−02 |
| A6 = | 1.1740E−01 | 1.1398E−01 | −3.1368E−02 | −2.5869E−02 | −1.4854E−02 | 7.6141E−03 |
| A8 = | −3.8702E−02 | −1.5220E−01 | 7.8411E−03 | 8.9632E−03 | 1.1910E−02 | −5.6693E−04 |

TABLE 6-continued

| Aspheric Coefficients | | | | | |
|---|---|---|---|---|---|
| A10 = | 5.4138E−03 | 1.3203E−01 | −2.7297E−03 | −2.7074E−03 | −2.5305E−03 | −8.3801E−05 |
| A12 = | −1.2597E−03 | −5.7733E−02 | 3.3083E−04 | 6.2009E−04 | 2.4035E−04 | 2.9698E−05 |
| A14 = | 3.1798E−04 | 1.1954E−02 | −9.8575E−06 | −8.4845E−05 | −9.0266E−06 | −3.1428E−06 |
| A16 = | | −9.3002E−04 | | 4.6610E−06 | 2.5281E−08 | 1.1746E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 4.00 | R9/R10 | −0.07 |
| Fno | 2.00 | (|R9| + |R10|)/f | 105.77 |
| HFOV [deg.] | 36.9 | |f/f3| | 0.60 |
| (V2 + V5)/V1 | 0.77 | f/f4 | −0.41 |
| (T45 + T56)/T23 | 0.17 | |f/f3| + |f/f4| + |f/f5| + |f/f6| | 1.20 |
| f/R4 | 0.58 | Yc62/f | 0.48 |
| (R5 + R6)/(R5 − R6) | 0.33 | TL/ImgH | 1.70 |

4th Embodiment

Figure 7:
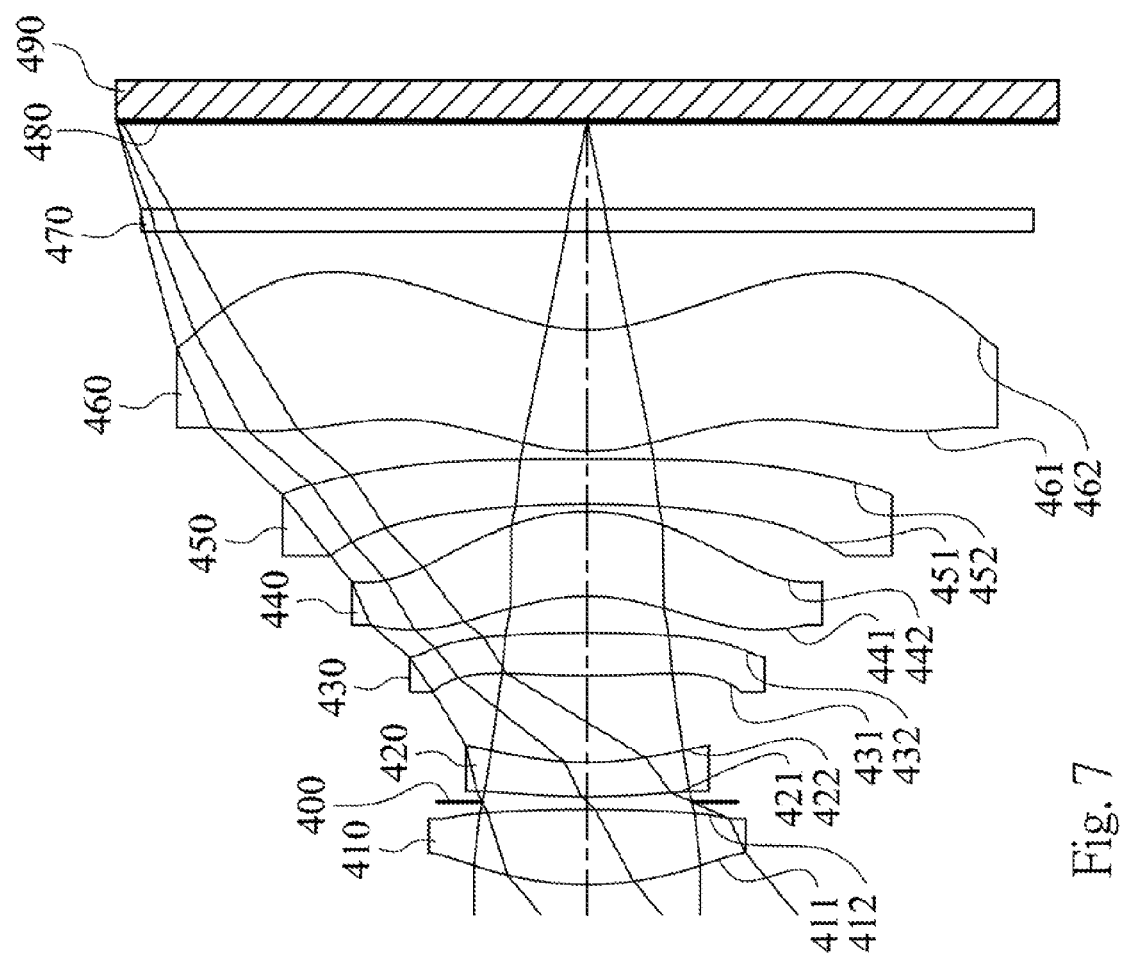
FIG. 7 is a schematic view of an image capturing device according to the 4th embodiment of the present disclosure.
Figure 8:
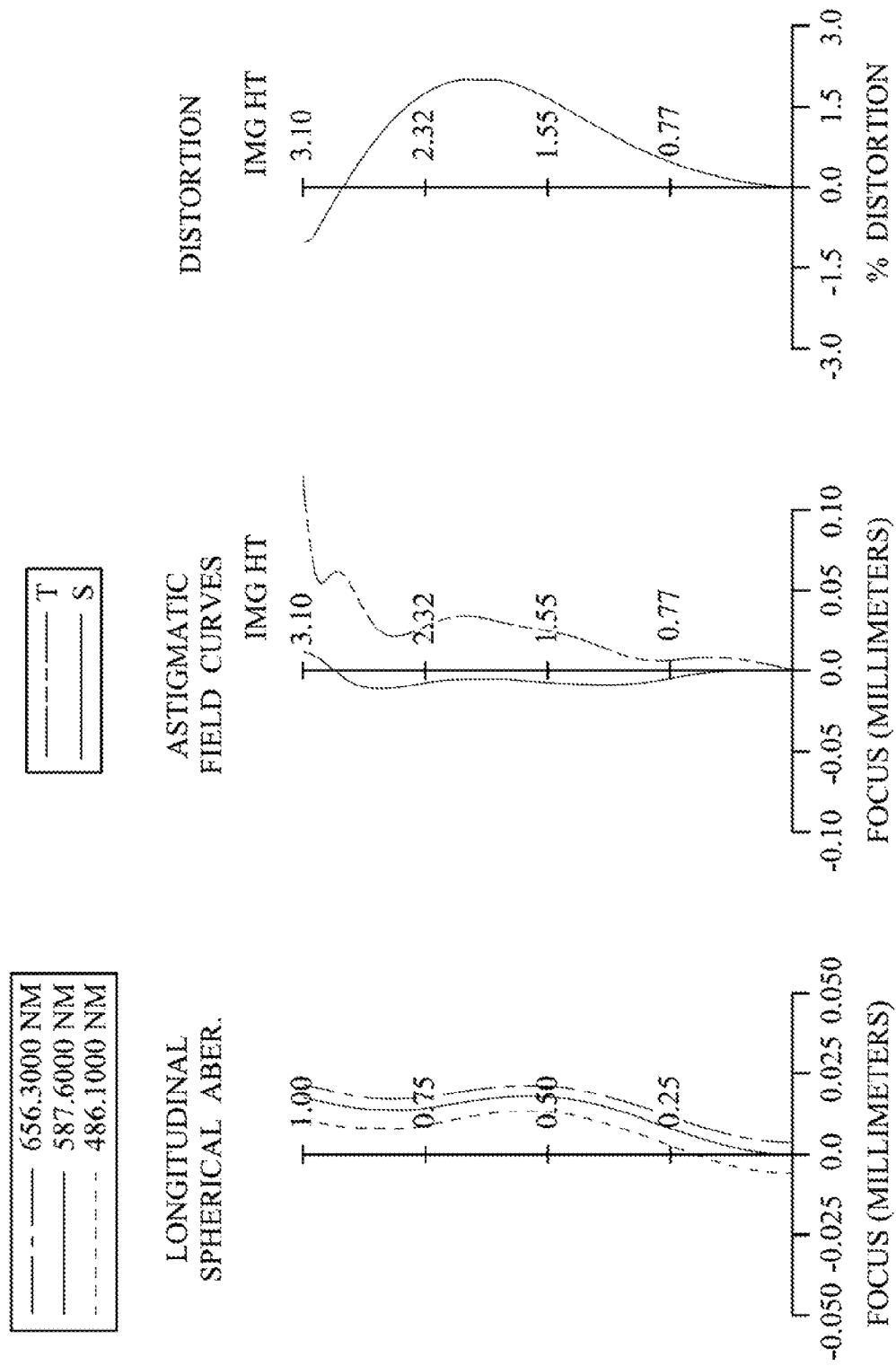
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows, in order from left to right, spherical aberration curves, astigmatic field curves and a distortion curve of the image capturing device according to the 4th embodiment.

In FIG. 7, the image capturing device includes the photographing optical lens assembly (not otherwise herein labeled) of the present disclosure and an image sensor 490. The photographing optical lens assembly includes, in order from an object side to an image side, a first lens element 410, an aperture stop 400, a second lens element 420, a third lens element 430, a fourth lens element 440, a fifth lens element 450, a sixth lens element 460, an IR-cut filter 470 and an image plane 480, wherein the photographing optical lens assembly has a total of six lens elements (410-460) with refractive power.

The first lens element 410 with positive refractive power has an object-side surface 411 being convex in a paraxial region thereof and an image-side surface 412 being convex in a paraxial region thereof, which are both aspheric, and the first lens element 410 is made of plastic material.

The second lens element 420 with negative refractive power has an object-side surface 421 being convex in a paraxial region thereof and an image-side surface 422 being concave in a paraxial region thereof, which are both aspheric, and the second lens element 420 is made of plastic material.

The third lens element 430 with positive refractive power has an object-side surface 431 being convex in a paraxial region thereof and an image-side surface 432 being convex in a paraxial region thereof, which are both aspheric, and the third lens element 430 is made of plastic material.

The fourth lens element 440 with positive refractive power has an object-side surface 441 being concave in a paraxial region thereof and an image-side surface 442 being convex in a paraxial region thereof, which are both aspheric, and the fourth lens element 440 is made of plastic material.

The fifth lens element 450 with negative refractive power has an object-side surface 451 being concave in a paraxial region thereof and an image-side surface 452 being convex in a paraxial region thereof, which are both aspheric, and the fifth lens element 450 is made of plastic material.

The sixth lens element 460 with positive refractive power has an object-side surface 461 being convex in a paraxial region thereof and an image-side surface 462 being concave in a paraxial region thereof, which are both aspheric, and the sixth lens element 460 is made of plastic material. Specifically, the image-side surface 462 of the sixth lens element 460 has at least one inflection point.

The IR-cut filter 470 is made of glass and located between the sixth lens element 460 and the image plane 480, and will not affect the focal length of the photographing optical lens assembly. The image sensor 490 is disposed on or near the image plane 480 of the photographing optical lens assembly.

The detailed optical data of the 4th embodiment are shown in Table 7 and the aspheric surface data are shown in Table 8 below.

TABLE 7

4th Embodiment
f = 3.73 mm, Fno = 2.50, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.173 | ASP | 0.495 | Plastic | 1.544 | 55.9 | 3.41 |
| 2 | | −11.656 | ASP | 0.050 | | | | |
| 3 | Ape. Stop | Plano | | 0.035 | | | | |
| 4 | Lens 2 | 4.346 | ASP | 0.222 | Plastic | 1.632 | 23.4 | −6.50 |
| 5 | | 2.070 | ASP | 0.576 | | | | |
| 6 | Lens 3 | 7.057 | ASP | 0.278 | Plastic | 1.535 | 55.7 | 7.05 |
| 7 | | −7.992 | ASP | 0.246 | | | | |
| 8 | Lens 4 | −1.314 | ASP | 0.553 | Plastic | 1.544 | 55.9 | 29.23 |
| 9 | | −1.394 | ASP | 0.050 | | | | |
| 10 | Lens 5 | −6.271 | ASP | 0.300 | Plastic | 1.640 | 23.3 | −11.52 |

TABLE 7-continued

4th Embodiment
f = 3.73 mm, Fno = 2.50, HFOV = 40.0 deg.

| Surface # | | Curvature Radius | Thickness | Material | Index | Abbe # | Focal Length |
|---|---|---|---|---|---|---|---|
| 11 | | −42.855 ASP | 0.050 | | | | |
| 12 | Lens 6 | 1.384 ASP | 0.800 | Plastic | 1.544 | 55.9 | 26.77 |
| 13 | | 1.217 ASP | 0.650 | | | | |
| 14 | IR-cut filter | Plano | 0.145 | Glass | 1.517 | 64.2 | — |
| 15 | | Plano | 0.580 | | | | |
| 16 | Image | Plano | — | | | | |

Note:
Reference wavelength is 587.6 nm (d-line).

TABLE 8

Aspheric Coefficients

| | Surface # | | | | | |
|---|---|---|---|---|---|---|
| | 1 | 2 | 4 | 5 | 6 | 7 |
| k = | 8.3854E−01 | −1.0000E+00 | −1.0000E+00 | −7.2625E+00 | −1.0000E+00 | 1.0000E+00 |
| A4 = | −2.7496E−02 | −2.6592E−02 | −1.4564E−01 | −6.3053E−02 | −6.1842E−02 | 3.3648E−02 |
| A6 = | 1.8035E−02 | 3.4656E−02 | 1.6383E−01 | 6.1477E−02 | −1.4243E−01 | −1.2644E−01 |
| A8 = | −8.0335E−02 | 3.4661E−02 | 4.2113E−02 | 5.8733E−02 | 3.1828E−01 | 2.0405E−01 |
| A10 = | 8.4004E−02 | −1.7403E−01 | −3.3342E−01 | −2.8742E−01 | −6.3138E−01 | −3.1757E−01 |
| A12 = | −3.8137E−02 | 1.2058E−01 | 9.7893E−02 | 2.1354E−01 | 4.8326E−01 | 2.1968E−01 |
| A14 = | −1.0419E−02 | −2.5771E−02 | 1.4709E−01 | −4.4335E−02 | −1.2712E−01 | −5.7655E−02 |
| A16 = | | | | | −4.0525E−03 | 5.9598E−03 |

| | Surface # | | | | | |
|---|---|---|---|---|---|---|
| | 8 | 9 | 10 | 11 | 12 | 13 |
| k = | −7.1825E+00 | −1.3152E+00 | −6.7946E+00 | 1.8346E+00 | −6.0475E+00 | −3.9969E+00 |
| A4 = | −5.1222E−02 | −2.6091E−02 | 1.6377E−02 | −5.7419E−03 | −5.2786E−02 | −4.9931E−02 |
| A6 = | 1.1548E−01 | 1.1389E−01 | −2.3407E−02 | −1.5560E−02 | −1.5023E−02 | 7.8565E−03 |
| A8 = | −4.1068E−02 | −1.5078E−01 | 7.8411E−03 | 9.6034E−03 | 1.1862E−02 | −6.5452E−04 |
| A10 = | 5.4138E−03 | 1.3206E−01 | −1.6847E−03 | −2.8419E−03 | −2.5296E−03 | −9.7548E−05 |
| A12 = | −1.3292E−03 | −5.7825E−02 | 2.4198E−04 | 5.7324E−04 | 2.4069E−04 | 2.8898E−05 |
| A14 = | 3.6294E−04 | 1.1912E−02 | −3.2088E−05 | −8.2785E−05 | −9.0567E−06 | −3.0975E−06 |
| A16 = | | −9.2747E−04 | | 5.4573E−06 | 3.0349E−08 | 1.4944E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

4th Embodiment

| f [mm] | 3.73 | R9/R10 | 0.15 |
|---|---|---|---|
| Fno | 2.50 | (|R9| + |R10|)/f | 13.17 |
| HFOV [deg.] | 40.0 | |f/f3| | 0.53 |
| (V2 + V5)/V1 | 0.84 | f/f4 | 0.13 |
| (T45 + T56)/T23 | 0.17 | |f/f3| + |f/f4| + |f/f5| + |f/f6| | 1.12 |
| f/R4 | 1.80 | Yc62/f | 0.45 |
| (R5 + R6)/(R5 − R6) | −0.06 | TL/ImgH | 1.62 |

5th Embodiment

Figure 9:
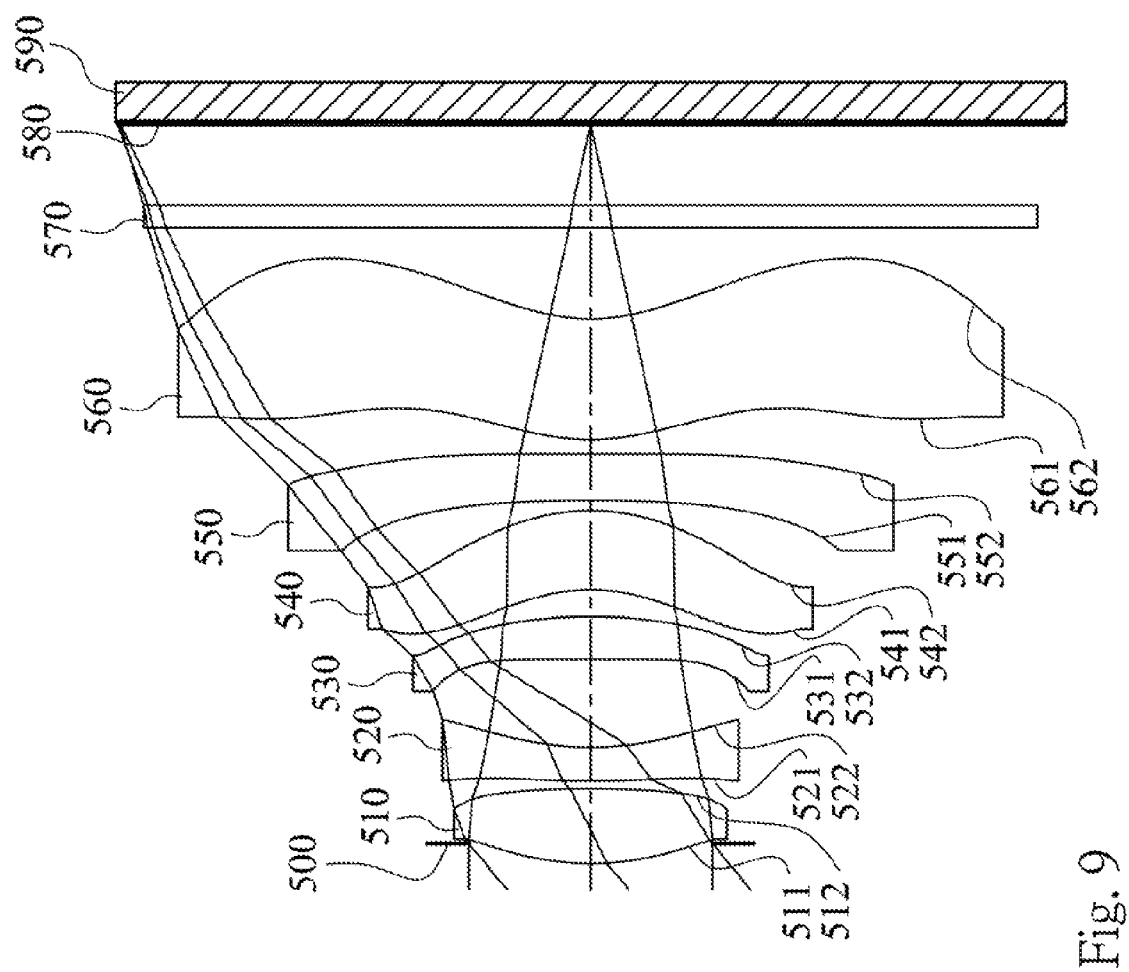
FIG. 9 is a schematic view of an image capturing device according to the 5th embodiment of the present disclosure.
Figure 10:
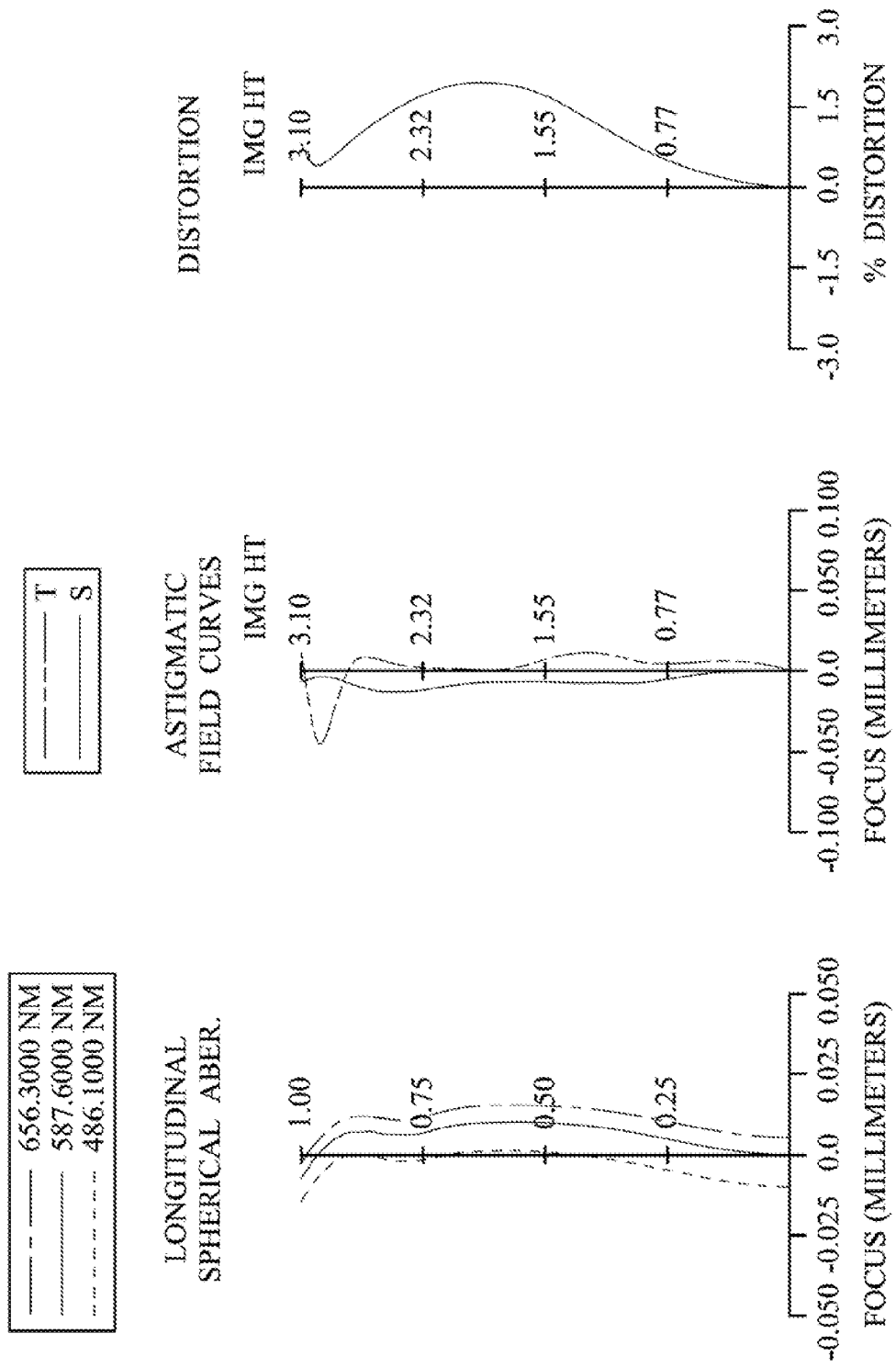
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows, in order from left to right, spherical aberration curves, astigmatic field curves and a distortion curve of the image capturing device according to the 5th embodiment.

In FIG. 9, the image capturing device includes the photographing optical lens assembly (not otherwise herein labeled) of the present disclosure and an image sensor 590. The photographing optical lens assembly includes, in order from an object side to an image side, an aperture stop 500, a first lens element 510, a second lens element 520, a third lens element 530, a fourth lens element 540, a fifth lens element 550, a sixth lens element 560, an IR-cut filter 570 and an image plane 580, wherein the photographing optical lens assembly has a total of six lens elements (510-560) with refractive power.

The first lens element 510 with positive refractive power has an object-side surface 511 being convex in a paraxial region thereof and an image-side surface 512 being convex in a paraxial region thereof, which are both aspheric, and the first lens element 510 is made of plastic material.

The second lens element 520 with negative refractive power has an object-side surface 521 being convex in a paraxial region thereof and an image-side surface 522 being concave in a paraxial region thereof, which are both aspheric, and the second lens element 520 is made of plastic material.

The third lens element 530 with positive refractive power has an object-side surface 531 being convex in a paraxial region thereof and an image-side surface 532 being convex in a paraxial region thereof, which are both aspheric, and the third lens element 530 is made of plastic material.

The fourth lens element 540 with negative refractive power has an object-side surface 541 being concave in a paraxial region thereof and an image-side surface 542 being convex in a paraxial region thereof, which are both aspheric, and the fourth lens element 540 is made of plastic material.

The fifth lens element 550 with negative refractive power has an object-side surface 551 being concave in a paraxial region thereof and an image-side surface 552 being convex in a paraxial region thereof, which are both aspheric, and the fifth lens element 550 is made of plastic material.

The sixth lens element 560 with positive refractive power has an object-side surface 561 being convex in a paraxial region thereof and an image-side surface 562 being concave in a paraxial region thereof, which are both aspheric, and the sixth lens element 560 is made of plastic material. Specifically, the image-side surface 562 of the sixth lens element 560 has at least one inflection point.

The IR-cut filter 570 is made of glass and located between the sixth lens element 560 and the image plane 580, and will not affect the focal length of the photographing optical lens assembly. The image sensor 590 is disposed on or near the image plane 580 of the photographing optical lens assembly.

The detailed optical data of the 5th embodiment are shown in Table 9 and the aspheric surface data are shown in Table 10 below.

TABLE 9

5th Embodiment
f = 3.67 mm, Fno = 2.30, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.130 | | | | |
| 2 | Lens 1 | 1.882 | ASP | 0.492 | Plastic | 1.535 | 56.3 | 2.80 |
| 3 | | −6.612 | ASP | 0.052 | | | | |
| 4 | Lens 2 | 6.962 | ASP | 0.220 | Plastic | 1.614 | 25.6 | −4.71 |
| 5 | | 2.018 | ASP | 0.576 | | | | |
| 6 | Lens 3 | 31.947 | ASP | 0.278 | Plastic | 1.535 | 56.3 | 5.47 |
| 7 | | −3.207 | ASP | 0.174 | | | | |
| 8 | Lens 4 | −1.119 | ASP | 0.521 | Plastic | 1.535 | 56.3 | −32.37 |
| 9 | | −1.391 | ASP | 0.068 | | | | |
| 10 | Lens 5 | −9.701 | ASP | 0.300 | Plastic | 1.535 | 56.3 | −18.73 |
| 11 | | −312.500 | ASP | 0.098 | | | | |
| 12 | Len 6 | 1.437 | ASP | 0.789 | Plastic | 1.535 | 56.3 | 96.41 |
| 13 | | 1.195 | ASP | 0.600 | | | | |
| 14 | IR-cut filter | Plano | | 0.145 | Glass | 1.517 | 64.2 | — |
| 15 | | Plano | | 0.539 | | | | |
| 16 | Image | Plano | | — | | | | |

Note:
Reference wavelength is 587.6 nm (d-line).

TABLE 10

Aspheric Coefficients

| | Surface # | | | | | |
|---|---|---|---|---|---|---|
| | 2 | 3 | 4 | 5 | 6 | 7 |
| k = | 7.3824E−01 | −1.0000E+00 | −1.0000E+00 | −5.6154E+00 | −1.0000E+00 | 1.0000E+00 |
| A4 = | −2.9869E−02 | −1.8948E−02 | −1.1516E−01 | −3.8675E−02 | −7.5992E−02 | 3.3774E−02 |
| A6 = | −5.1558E−03 | −1.3400E−03 | 1.5103E−01 | 8.3619E−02 | −1.5095E−01 | −1.1879E−01 |
| A8 = | −1.0234E−01 | −4.1954E−02 | −3.7101E−02 | 4.9392E−02 | 3.1091E−01 | 2.0304E−01 |
| A10 = | 9.3468E−02 | −2.1518E−01 | −3.4900E−01 | −2.6627E−01 | −6.3246E−01 | −3.1808E−01 |
| A12 = | −3.8137E−02 | 1.3033E−01 | 2.2739E−01 | 1.9755E−01 | 4.9802E−01 | 2.2008E−01 |
| A14 = | −1.5258E−01 | −2.6303E−02 | 6.8536E−02 | −4.4335E−02 | −1.0436E−01 | −5.5818E−02 |
| A16 = | | | | | −3.3612E−02 | 6.9569E−03 |

| | Surface # | | | | | |
|---|---|---|---|---|---|---|
| | 8 | 9 | 10 | 11 | 12 | 13 |
| k = | −4.7279E+00 | −1.3153E+00 | −2.0000E+01 | 1.8346E+00 | −6.1839E+00 | −3.7977E+00 |
| A4 = | −4.8791E−02 | −3.8020E−02 | −1.0999E−02 | −4.9626E−03 | −5.1118E−02 | −4.9537E−02 |
| A6 = | 1.1697E−01 | 1.0799E−01 | −1.5761E−02 | −1.7298E−02 | −1.5288E−02 | 7.7175E−03 |
| A8 = | −3.9901E−02 | −1.5032E−01 | 7.8413E−02 | 1.0048E−02 | 1.1871E−02 | −6.2528E−04 |
| A10 = | 5.4138E−03 | 1.3238E−01 | −1.9677E−03 | −2.8627E−03 | −2.5280E−03 | −9.4533E−05 |
| A12 = | −8.4307E−04 | −5.7622E−02 | 4.3471E−04 | 5.7790E−04 | 2.4092E−04 | 2.8745E−05 |
| A14 = | 2.7953E−04 | 1.2026E−02 | −1.2590E−04 | −7.8221E−05 | −9.0655E−06 | −3.1333E−06 |
| A16 = | | −9.1173E−04 | | 3.8207E−06 | 1.6611E−08 | 1.4484E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.67 | R9/R10 | 0.03 |
| Fno | 2.30 | (|R9| + |R10|)/f | 87.92 |
| HFOV [deg.] | 40.0 | |f/f3| | 0.67 |
| (V2 + V5)/V1 | 1.45 | f/f4 | −0.11 |
| (T45 + T56)/T23 | 0.29 | |f/f3| + |f/f4| + |f/f5| + |f/f6| | 1.02 |
| f/R4 | 1.82 | Yc62/f | 0.46 |
| (R5 + R6)/(R5 − R6) | 0.82 | TL/ImgH | 1.57 |

6th Embodiment

Figure 11:
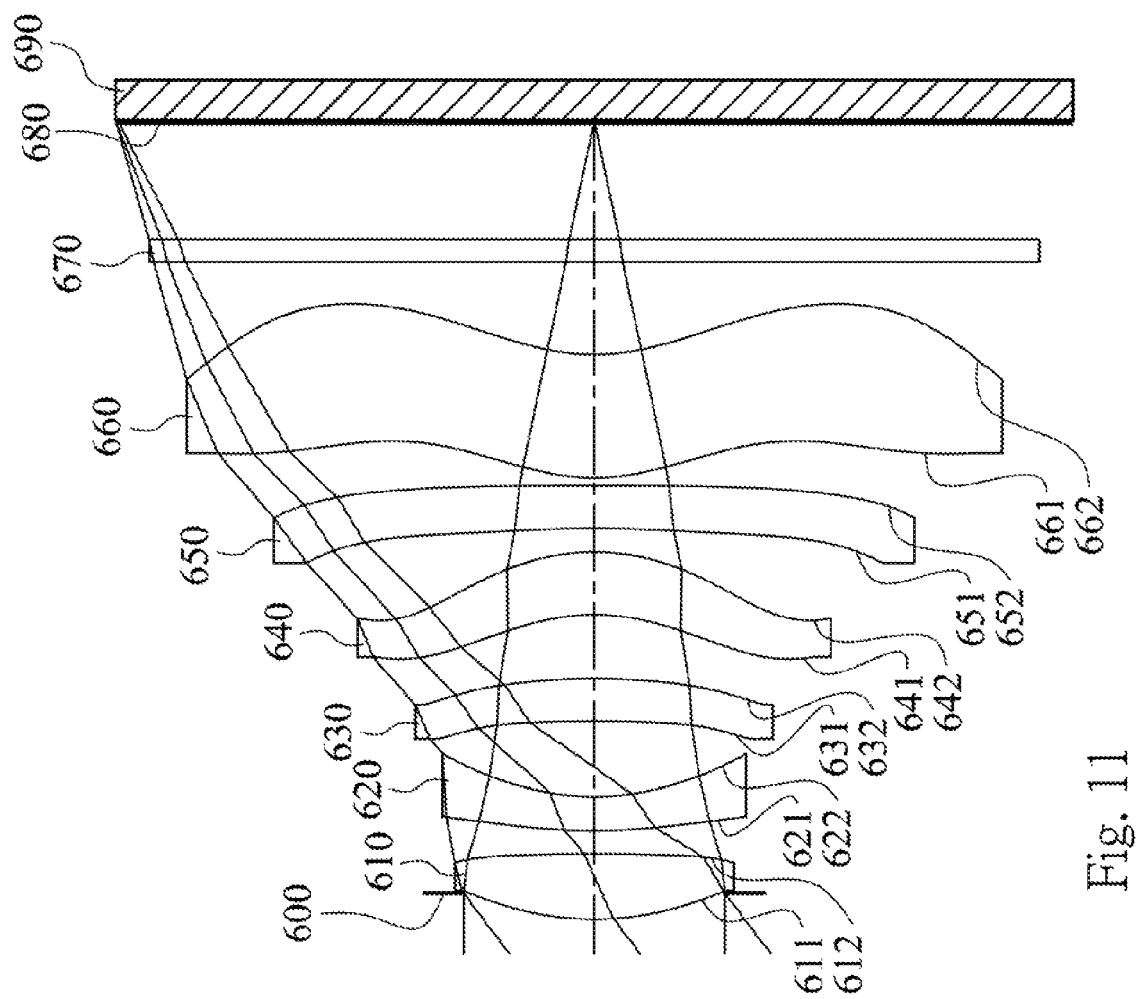
FIG. 11 is a schematic view of an image capturing device according to the 6th embodiment of the present disclosure.
Figure 12:
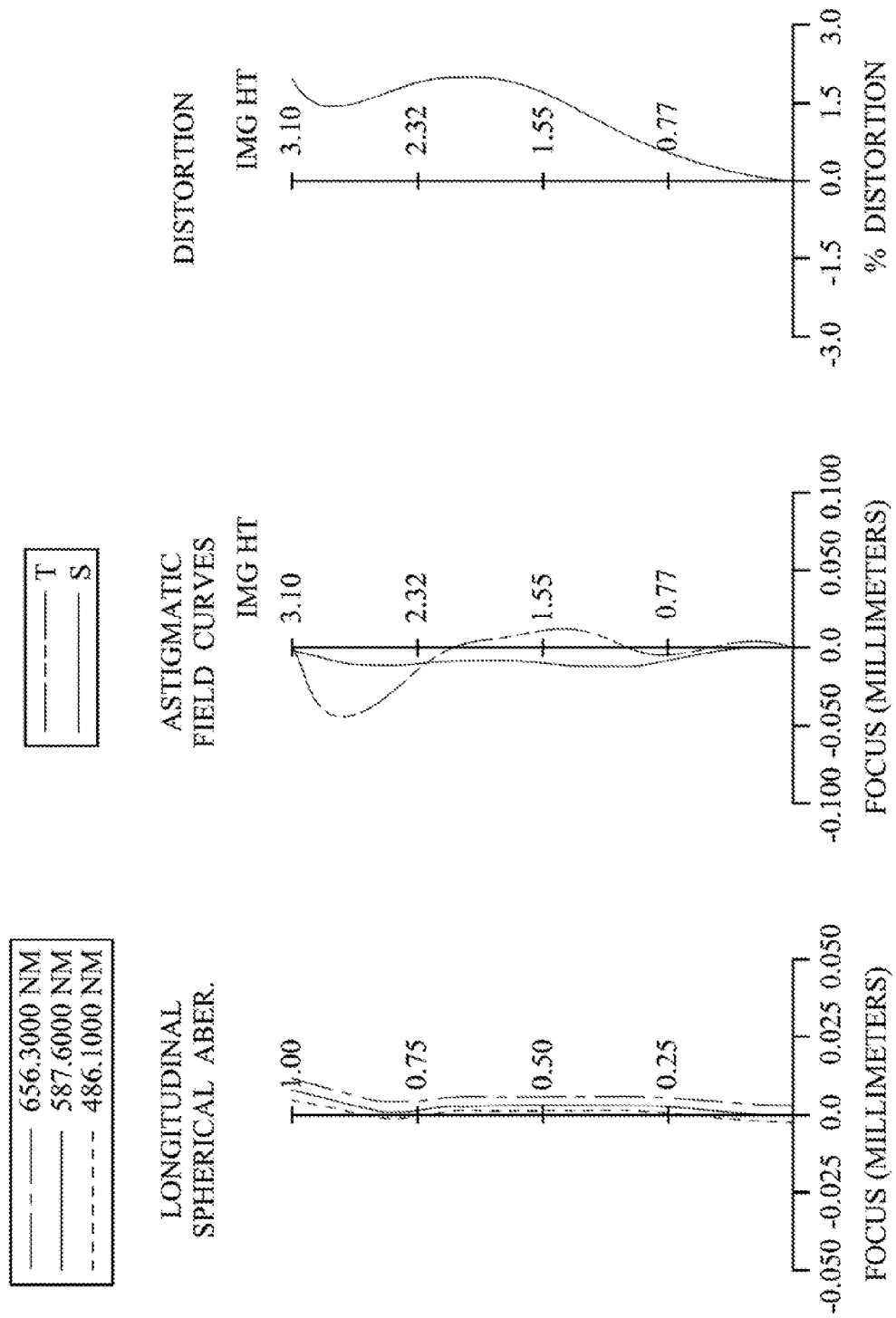
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows, in order from left to right, spherical aberration curves, astigmatic field curves and a distortion curve of the image capturing device according to the 6th embodiment.

In FIG. 11, the image capturing device includes the photographing optical lens assembly (not otherwise herein labeled) of the present disclosure and an image sensor 690. The photographing optical lens assembly includes, in order from an object side to an image side, an aperture stop 600, a first lens element 610, a second lens element 620, a third lens element 630, a fourth lens element 640, a fifth lens element 650, a sixth lens element 660, an IR-cut filter 670 and an image plane 680, wherein the photographing optical lens assembly has a total of six lens elements (610-660) with refractive power.

The first lens element 610 with positive refractive power has an object-side surface 611 being convex in a paraxial region thereof and an image-side surface 612 being convex in a paraxial region thereof, which are both aspheric, and the first lens element 610 is made of plastic material.

The second lens element 620 with negative refractive power has an object-side surface 621 being convex in a paraxial region thereof and an image-side surface 622 being concave in a paraxial region thereof, which are both aspheric, and the second lens element 620 is made of plastic material.

The third lens element 630 with positive refractive power has an object-side surface 631 being concave in a paraxial region thereof and an image-side surface 632 being convex in a paraxial region thereof, which are both aspheric, and the third lens element 630 is made of plastic material.

The fourth lens element 640 with negative refractive power has an object-side surface 641 being concave in a paraxial region thereof and an image-side surface 642 being convex in a paraxial region thereof, which are both aspheric, and the fourth lens element 640 is made of plastic material.

The fifth lens element 650 with negative refractive power has an object-side surface 651 being concave in a paraxial region thereof and an image-side surface 652 being convex in a paraxial region thereof, which are both aspheric, and the fifth lens element 650 is made of plastic material.

The sixth lens element 660 with positive refractive power has an object-side surface 661 being convex in a paraxial region thereof and an image-side surface 662 being concave in a paraxial region thereof, which are both aspheric, and the sixth lens element 660 is made of plastic material. Specifically, the image-side surface 662 of the sixth lens element 660 has at least one inflection point.

The IR-cut filter 670 is made of glass and located between the sixth lens element 660 and the image plane 680, and will not affect the focal length of the photographing optical lens assembly. The image sensor 690 is disposed on or near the image plane 680 of the photographing optical lens assembly.

The detailed optical data of the 6th embodiment are shown in Table 11 and the aspheric surface data are shown in Table 12 below.

TABLE 11

6th Embodiment
f = 4.06 mm, Fno = 2.40, HFOV = 36.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.170 | | | | |
| 2 | Lens 1 | 1.904 | ASP | 0.424 | Plastic | 1.544 | 55.9 | 3.13 |
| 3 | | −14.715 | ASP | 0.150 | | | | |
| 4 | Lens 2 | 3.320 | ASP | 0.220 | Plastic | 1.634 | 23.8 | −4.88 |
| 5 | | 1.560 | ASP | 0.490 | | | | |
| 6 | Lens 3 | −14.858 | ASP | 0.278 | Plastic | 1.535 | 55.7 | 10.32 |
| 7 | | −4.051 | ASP | 0.413 | | | | |
| 8 | Lens 4 | −1.257 | ASP | 0.408 | Plastic | 1.544 | 55.9 | −119.08 |
| 9 | | −1.428 | ASP | 0.150 | | | | |
| 10 | Lens 5 | −7.003 | ASP | 0.280 | Plastic | 1.634 | 23.8 | −13.62 |
| 11 | | −37.570 | ASP | 0.050 | | | | |
| 12 | Lens 6 | 1.283 | ASP | 0.800 | Plastic | 1.544 | 55.9 | 9.27 |
| 13 | | 1.343 | ASP | 0.600 | | | | |
| 14 | IR-cut filter | Plano | | 0.145 | Glass | 1.517 | 64.2 | — |
| 15 | | Plano | | 0.766 | | | | |
| 16 | Image | Plano | | — | | | | |

Note:
Reference wavelength is 587.6 nm (d-line).

TABLE 12

Aspheric Coefficients

| Surface # | 2 | 3 | 4 | 5 | 6 | 7 |
|---|---|---|---|---|---|---|
| k = | 8.6380E−01 | −1.0000E+00 | −1.0000E+00 | −4.3213E+00 | −1.0000E+00 | 1.0000E+00 |
| A4 = | −2.2933E−02 | −3.9636E−03 | −1.3209E−01 | −2.7017E−02 | −4.3767E−02 | 4.7553E−02 |
| A6 = | −1.3139E−03 | −1.1930E−02 | 1.4218E−01 | 8.6301E−02 | −1.3666E−01 | −1.4276E−01 |
| A8 = | −7.6714E−02 | 1.7094E−02 | 1.2565E−02 | 5.9641E−02 | 3.2481E−01 | 2.2573E−01 |
| A10 = | 7.9011E−02 | −1.2705E−01 | −2.4296E−01 | −2.1701E−01 | −5.9825E−01 | −3.0854E−01 |
| A12 = | −3.8137E−01 | 1.1507E−01 | 2.1154E−01 | 1.7928E−01 | 5.0766E−01 | 2.1923E−01 |
| A14 = | −4.9329E−02 | −7.1093E−02 | −4.7547E−02 | −4.4335E−02 | −2.2345E−01 | −6.0235E−02 |
| A16 = | | | | | −6.7115E−03 | 6.0175E−03 |

| Surface # | 8 | 9 | 10 | 11 | 12 | 13 |
|---|---|---|---|---|---|---|
| k = | −6.8589E+00 | −1.3152E+00 | −2.0000E+01 | 1.8346E+00 | −5.3342E+00 | −3.7961E+00 |
| A4 = | −9.0910E−02 | −5.4251E−02 | 4.9547E−02 | 1.0310E−02 | −5.0650E−02 | −5.6720E−02 |
| A6 = | 1.1968E−01 | 1.3023E−01 | −3.0020E−02 | −1.6957E−02 | −1.5961E−02 | 8.6463E−03 |
| A8 = | −3.6144E−02 | −1.5047E−01 | 7.8411E−03 | 8.4144E−03 | 1.1880E−02 | −6.8994E−04 |
| A10 = | 5.4138E−03 | 1.3156E−01 | −1.2838E−03 | −2.6774E−03 | −2.5261E−03 | −9.5812E−05 |
| A12 = | −1.2034E−03 | −5.7895E−02 | 5.0352E−05 | 5.9520E−04 | 2.4133E−04 | 2.9114E−05 |
| A14 = | 1.3788E−04 | 1.1883E−02 | 9.2507E−06 | −8.5356E−05 | −9.0649E−06 | −3.0641E−06 |
| A16 = | | −9.2321E−04 | | 5.3007E−06 | 2.6671E−08 | 1.4623E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.06 | R9/R10 | 0.19 |
| Fno | 2.40 | (|R9| + |R10|)/f | 10.97 |
| HFOV [deg.] | 36.8 | |f/f3| | 0.39 |
| (V2 + V5)/V1 | 0.85 | f/f4 | −0.03 |
| (T45 + T56)/T23 | 0.41 | |f/f3| + |f/f4| + |f/f5| + |f/f6| | 1.16 |
| f/R4 | 2.60 | Yc62/f | 0.39 |
| (R5 + R6)/(R5 − R6) | 1.75 | TL/ImgH | 1.67 |

7th Embodiment

Figure 14:
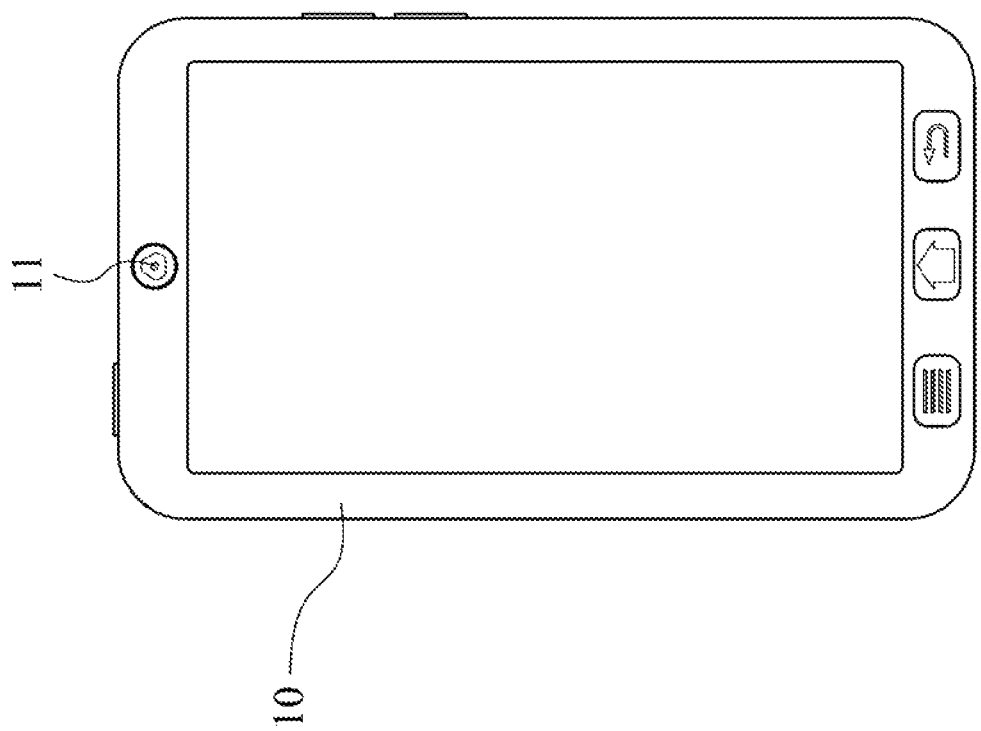
FIG. 14 shows a mobile terminal according to the 7th embodiment of the present disclosure.

FIG. 14 is a schematic view of a mobile terminal 10 according to the 7th embodiment of the present disclosure. The mobile terminal 10 of the 7th embodiment is a smart phone, wherein the mobile terminal 10 includes an image capturing device 11. The image capturing device 11 includes a photographing optical lens assembly (not otherwise herein labeled) according to the present disclosure and an image sensor (not otherwise herein labeled), wherein the image sensor is disposed on or near an image plane of the photographing optical lens assembly.

8th Embodiment

Figure 15:
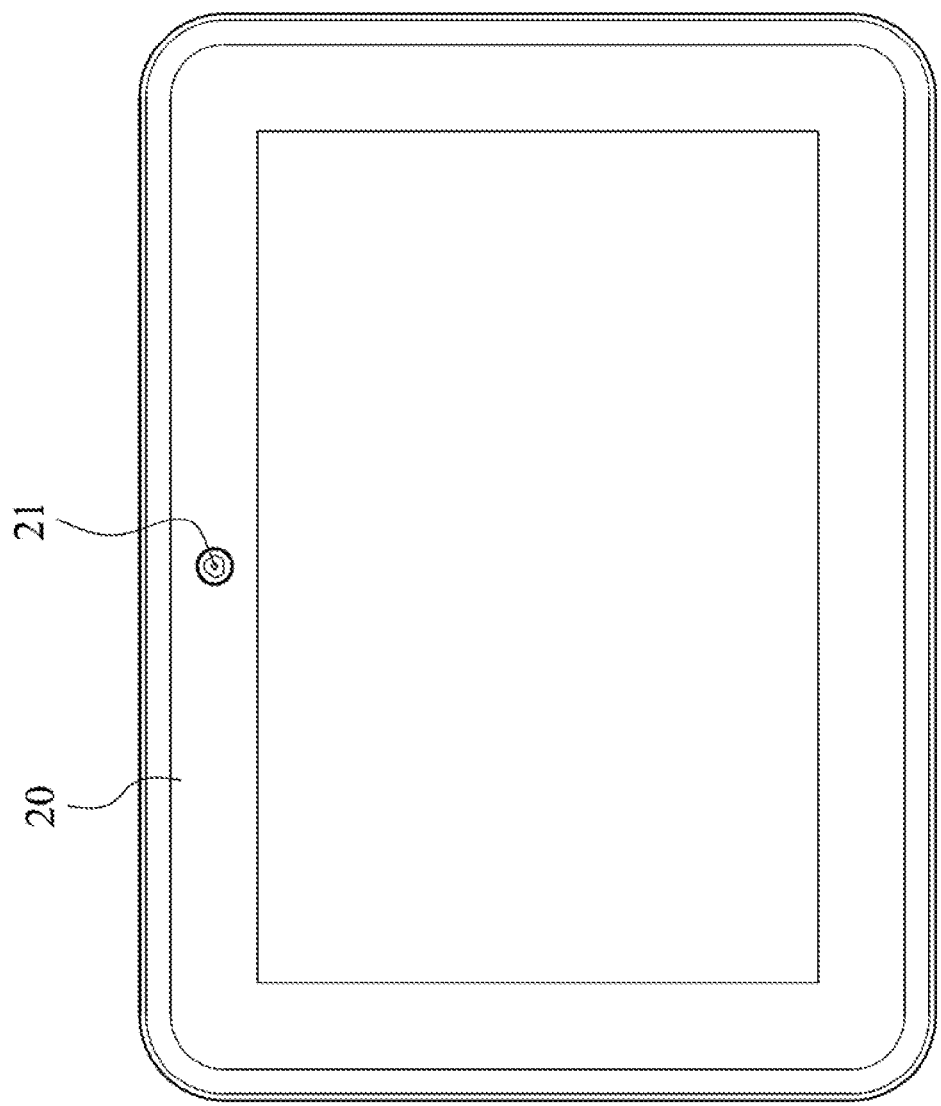
FIG. 15 shows a mobile terminal according to the 8th embodiment of the present disclosure.

FIG. 15 is a schematic view of a mobile terminal 20 according to the 8th embodiment of the present disclosure. The mobile terminal 20 of the 8th embodiment is a tablet personal computer, wherein the mobile terminal 20 includes an image capturing device 21. The image capturing device 21 includes a photographing optical lens assembly (not otherwise herein labeled) according to the present disclosure and an image sensor (not otherwise herein labeled), wherein the image sensor is disposed on or near an image plane of the photographing optical lens assembly.

9th Embodiment

Figure 16:
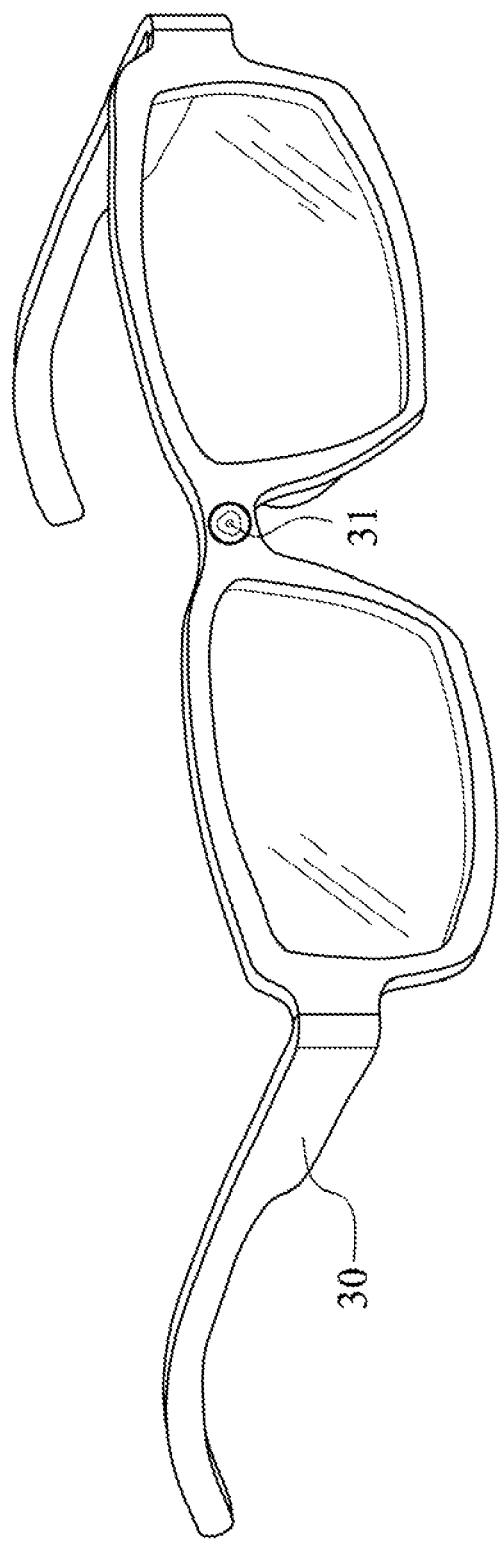
FIG. 16 shows a mobile terminal according to the 9th embodiment of the present disclosure.

FIG. 16 is a schematic view of a mobile terminal 30 according to the 9th embodiment of the present disclosure. The mobile terminal 30 of the 9th embodiment is a head-mounted display, wherein the mobile terminal 30 includes an image capturing device 31. The image capturing device 31 includes a photographing optical lens assembly (not otherwise herein labeled) according to the present disclosure and an image sensor (not otherwise herein labeled), wherein the image sensor is disposed on or near an image plane of the photographing optical lens assembly.

The foregoing description, for purpose of explanation, has been described with reference to specific embodiments. It is to be noted that TABLES 1-12 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising, in order from an object side to an image side:
   a first lens element having positive refractive power;
   a second lens element with negative refractive power having an object-side surface being convex in a paraxial region thereof and an image-side surface being concave in a paraxial region thereof;
   a third lens element;
   a fourth lens element;
   a fifth lens element having an object-side surface and an image-side surface being both aspheric; and
   a sixth lens element having an image-side surface being concave in a paraxial region thereof, wherein an object-side surface and the image-side surface of the sixth lens element are aspheric, and the image-side surface of the sixth lens element comprises at least one inflection point;
   wherein the photographing optical lens assembly has a total of six lens elements, an absolute value of a focal length of the second lens element is smaller than an absolute value of a focal length of the fifth lens element, an absolute value of a focal length of the third lens element is smaller than the absolute value of the focal length of the fifth lens element, an absolute value of a curvature radius of the image-side surface of the sixth lens element is smaller than an absolute value of a curvature radius of the object-side surface of the sixth lens element, an absolute value of a curvature radius of an object-side surface of the fourth lens element is smaller than an absolute value of a curvature radius of the object-side surface of the fifth lens element, a focal length of the photographing optical lens assembly is f, the curvature radius of the object-side surface of the fifth lens element is R9, a curvature radius of the image-side surface of the fifth lens element is R10, and the following condition is satisfied:

$13.17 \le (|R9|+|R10|)/f$.

2. The photographing optical lens assembly of claim 1, wherein the fourth lens element with positive refractive power has the object-side surface being concave in a paraxial region thereof and an image-side surface being convex in a paraxial region thereof.

3. The photographing optical lens assembly of claim 1, wherein the third lens element has positive refractive power.

4. The photographing optical lens assembly of claim 1, wherein the third lens element has an object-side surface being convex in a paraxial region thereof.

5. The photographing optical lens assembly of claim 1, wherein an Abbe number of the first lens element is V1, an Abbe number of the second lens element is V2, an Abbe number of the fifth lens element is V5, and the following condition is satisfied:

$0.5 < (V2+V5)/V1 < 1.0$.

6. The photographing optical lens assembly of claim 1, wherein there is an air space between every two lens elements of the first lens element, the second lens element, the third lens element, the fourth lens element, the fifth lens element and the sixth lens element that are adjacent to each other, an axial distance between an object-side surface of the first lens element and an image plane is TL, a maximum image height of the photographing optical lens assembly is ImgH, and the following condition is satisfied:

$TL/ImgH < 1.9$.

7. The photographing optical lens assembly of claim 1, wherein the focal length of the photographing optical lens assembly is f, a vertical distance between a non-axial critical point on the image-side surface of the sixth lens element and an optical axis is Yc62, and the following condition is satisfied:

$0.1 < Yc62/f < 0.8$.

8. The photographing optical lens assembly of claim 1, wherein an absolute value of a curvature radius of an object-side surface of the first lens element is smaller than an absolute value of a curvature radius of an image-side surface the of first lens element.

9. The photographing optical lens assembly of claim 1, wherein a central thickness of the fourth lens element is greater than a central thickness of the fifth lens element.

10. A photographing optical lens assembly comprising, in order from an object side to an image side:
    a first lens element having positive refractive power;
    a second lens element;
    a third lens element;
    a fourth lens element having an image-side surface being convex in a paraxial region thereof;
    a fifth lens element having an object-side surface and an image-side surface being both aspheric; and
    a sixth lens element having an image-side surface being concave in a paraxial region thereof, wherein an object-side surface and the image-side surface of the sixth lens element are aspheric, and each of the object-side surface and the image-side surface of the sixth lens element comprises at least one inflection point;
    wherein the photographing optical lens assembly has a total of six lens elements, there is an air space between every two lens elements of the first lens element, the second lens element, the third lens element, the fourth lens element, the fifth lens element and the sixth lens element that are adjacent to each other, an absolute value of a focal length of the first lens element is smaller than an absolute value of a focal length of the fifth lens element, an absolute value of a focal length of the second lens element is smaller than the absolute value of the focal length of the fifth lens element, a focal length of the photographing optical lens assembly is f, a curvature radius of the object-side surface of the fifth lens element is R9, a curvature radius of the image-side surface of the fifth lens element is R10, and the following condition is satisfied:

$87.92 \le (|R9|+|R10|)/f$.

11. The photographing optical lens assembly of claim 10, wherein the sixth lens element has the object-side surface being convex in a paraxial region thereof.

12. The photographing optical lens assembly of claim 10, wherein the second lens element with negative refractive power has an image-side surface being concave in a paraxial region thereof.

13. The photographing optical lens assembly of claim 10, wherein the third lens element has positive refractive power, the focal length of the photographing optical lens assembly is f, a curvature radius of an image-side surface of the second lens element is R4, and the following condition is satisfied:

$0.3 < f/R4 < 4.0$.

14. The photographing optical lens assembly of claim 10, wherein an Abbe number of the first lens element is V1, an Abbe number of the second lens element is V2, an Abbe number of the fifth lens element is V5, and the following condition is satisfied:

$0.5<(V2+V5)/V1<1.0$.

15. The photographing optical lens assembly of claim 10, wherein an axial distance between an object-side surface of the first lens element and an image plane is TL, a maximum image height of the photographing optical lens assembly is ImgH, and the following condition is satisfied:

$TL/ImgH<1.9$.

16. The photographing optical lens assembly of claim 15, wherein the axial distance between the object-side surface of the first lens element and the image plane is TL, the maximum image height of the photographing optical lens assembly is ImgH, and the following condition is satisfied:

$TL/ImgH \leq 1.57$.

17. The photographing optical lens assembly of claim 10, wherein the focal length of the photographing optical lens assembly is f, a vertical distance between a non-axial critical point on the image-side surface of the sixth lens element and an optical axis is Yc62, and the following condition is satisfied:

$0.1<Yc62/f<0.8$.

18. The photographing optical lens assembly of claim 10, wherein an absolute value of a curvature radius of the image-side surface of the sixth lens element is smaller than an absolute value of a curvature radius of the object-side surface of the sixth lens element.

19. The photographing optical lens assembly of claim 10, wherein an absolute value of a curvature radius of an object-side surface of the fourth lens element is smaller than an absolute value of a curvature radius of the object-side surface of the fifth lens element.

20. The photographing optical lens assembly of claim 10, wherein the third lens element has an object-side surface being convex in a paraxial region thereof, and an absolute value of a focal length of the third lens element is smaller than the absolute value of the focal length of the fifth lens element.

21. An image capturing device, comprising:
the photographing optical lens assembly of claim 10; and
an image sensor, wherein the image sensor is located on or near an image plane of the photographing optical lens assembly.

22. A mobile terminal, comprising:
the image capturing device of claim 21.

23. A photographing optical lens assembly comprising, in order from an object side to an image side:
a first lens element having positive refractive power;
a second lens element with negative refractive power having an image-side surface being concave in a paraxial region thereof;
a third lens element;
a fourth lens element;
a fifth lens element having an object-side surface and an image-side surface being aspheric; and
a sixth lens element having an image-side surface being concave in a paraxial region thereof, wherein an object-side surface and the image-side surface of the sixth lens element are aspheric, and the image-side surface of the sixth lens element comprises at least one inflection point;

wherein the photographing optical lens assembly has a total of six lens elements, there is an air space between every two lens elements of the first lens element, the second lens element, the third lens element, the fourth lens element, the fifth lens element and the sixth lens element that are adjacent to each other, an absolute value of a focal length of the third lens element is smaller than an absolute value of a focal length of the fifth lens element, a central thickness of the third lens element is smaller than a central thickness of the fourth lens element, an absolute value of a curvature radius of the image-side surface of the second lens element is smaller than an absolute value of a curvature radius of an object-side surface of the second lens element, a focal length of the photographing optical lens assembly is f, a curvature radius of the object-side surface of the fifth lens element is R9, a curvature radius of the image-side surface of the fifth lens element is R10, an Abbe number of the first lens element is V1, an Abbe number of the second lens element is V2, an Abbe number of the fifth lens element is V5, and the following conditions are satisfied:

$10.97 \leq (|R9|+|R10|)/f$; and $0.5<(V2+V5)/V1<1.0$.

24. The photographing optical lens assembly of claim 23, wherein the third lens element has positive refractive power.

25. The photographing optical lens assembly of claim 23, wherein an axial distance between an object-side surface of the first lens element and an image plane is TL, a maximum image height of the photographing optical lens assembly is ImgH, and the following condition is satisfied:

$TL/ImgH \leq 1.62$.

26. The photographing optical lens assembly of claim 23, wherein the third lens element has an object-side surface being convex in a paraxial region thereof, the focal length of the photographing optical lens assembly is f, a vertical distance between a non-axial critical point on the image-side surface of the sixth lens element and an optical axis is Yc62, and the following condition is satisfied:

$0.1<Yc62/f<0.8$.

27. The photographing optical lens assembly of claim 23, wherein an absolute value of a focal length of the first lens element is smaller than an absolute value of a focal length of the fourth lens element.

28. The photographing optical lens assembly of claim 23, wherein an absolute value of a curvature radius of an object-side surface of the fourth lens element is smaller than an absolute value of the curvature radius of the object-side surface of the fifth lens element.

29. The photographing optical lens assembly of claim 23, wherein an absolute value of a curvature radius of the image-side surface of the sixth lens element is smaller than an absolute value of a curvature radius of the object-side surface of the sixth lens element.

30. The photographing optical lens assembly of claim 23, wherein an axial distance between the first lens element and the second lens element is smaller than an axial distance between the second lens element and the third lens element.

* * * * *